(12) United States Patent
Wurden et al.

(10) Patent No.: US 11,688,899 B2
(45) Date of Patent: Jun. 27, 2023

(54) BATTERIES FOR ELECTRIC MARINE PROPULSION SYSTEMS, AND ASSOCIATED SYSTEMS AND METHODS

(71) Applicant: Pure Watercraft, Inc., Seattle, WA (US)

(72) Inventors: Richard Theodore Wurden, Seattle, WA (US); Marc McKissack, Seattle, WA (US); Andrew Rebele, Seattle, WA (US)

(73) Assignee: Pure Watercraft, Inc., Seattle, WA (US)

( * ) Notice: Subject to any disclaimer, the term of this patent is extended or adjusted under 35 U.S.C. 154(b) by 268 days.

(21) Appl. No.: 16/546,212

(22) Filed: Aug. 20, 2019

(65) Prior Publication Data

US 2020/0067041 A1 Feb. 27, 2020

Related U.S. Application Data

(60) Provisional application No. 62/792,215, filed on Jan. 14, 2019, provisional application No. 62/720,922, (Continued)

(51) Int. Cl.
*H01M 50/10* (2021.01)
*H01M 10/6551* (2014.01)
(Continued)

(52) U.S. Cl.
CPC ...... *H01M 10/6551* (2015.04); *B63H 20/007* (2013.01); *B63H 21/17* (2013.01);
(Continued)

(58) Field of Classification Search
CPC .... H01M 50/20; H01M 10/65; H01M 50/502; H01M 50/308; H01M 50/35;
(Continued)

(56) References Cited

U.S. PATENT DOCUMENTS

D298,029 S  10/1988  Foster
5,204,609 A  4/1993  Alisauski
(Continued)

FOREIGN PATENT DOCUMENTS

CN  101399363  4/2009
CN  207624834  7/2018
(Continued)

OTHER PUBLICATIONS

U.S. Appl. No. 29/625,869, filed Nov. 13, 2017, Milroy.
(Continued)

*Primary Examiner* — Jonathan G Jelsma
*Assistant Examiner* — Omar M Kekia
(74) *Attorney, Agent, or Firm* — Perkins Coie LLP

(57) ABSTRACT

A battery pack (e.g., a battery pack for marine environments) can include a lower enclosure having an upper wall and defining a cavity, a plurality of battery cells positioned within the cavity, a radiator assembly positioned above the upper wall of the lower enclosure, a vent in the upper wall of the cavity, and/or a valve configured to selectively facilitate fluid communication between the cavity and the radiator assembly via the vent. In some embodiments, the valve is configured to open in response to increased pressure in the cavity resulting from a thermal runaway event. In some embodiments, the radiator is configured to create a tortuous path and collect flammable particulates from the thermal runaway event.

6 Claims, 20 Drawing Sheets

Related U.S. Application Data filed on Aug. 21, 2018, provisional application No. 62/720,926, filed on Aug. 21, 2018.

(51) Int. Cl.

| | | |
|---|---|---|
| *B63H 21/17* | (2006.01) | |
| *H01R 13/523* | (2006.01) | |
| *H01R 13/53* | (2006.01) | |
| *H01M 10/65* | (2014.01) | |
| *H01R 13/11* | (2006.01) | |
| *B63H 20/00* | (2006.01) | |
| *H01M 50/271* | (2021.01) | |
| *H01M 50/213* | (2021.01) | |
| *H01M 50/526* | (2021.01) | |
| *H01M 50/503* | (2021.01) | |
| *H01M 50/367* | (2021.01) | |

(52) U.S. Cl.
CPC .......... *H01M 10/65* (2015.04); *H01M 50/213* (2021.01); *H01M 50/271* (2021.01); *H01M 50/367* (2021.01); *H01M 50/503* (2021.01); *H01M 50/526* (2021.01); *H01R 13/11* (2013.01); *H01R 13/523* (2013.01); *H01R 13/53* (2013.01); *H01M 2220/20* (2013.01); *H01R 2201/26* (2013.01)

(58) Field of Classification Search
CPC .......... H01M 10/6551; H01M 2220/20; H01M 50/503; H01M 50/213; H01M 50/526; H01M 50/271; H01M 50/367; H01R 13/11; H01R 13/53; H01R 2201/26; H01R 13/523; Y02E 60/10; B63H 20/007; B63H 21/17; B63H 21/28
USPC .......................................................... 429/99
See application file for complete search history.

(56) References Cited

U.S. PATENT DOCUMENTS

| | | |
|---|---|---|
| D351,134 S | 10/1994 | Hunziker |
| 5,432,019 A | 7/1995 | Hue |
| D390,834 S | 2/1998 | Dizon et al. |
| D402,275 S | 12/1998 | Korhonen |
| D430,115 S | 8/2000 | Cole et al. |
| D437,586 S | 2/2001 | Sonntag |
| 7,081,589 B1 | 7/2006 | Advey |
| D593,970 S | 6/2009 | Sonntag |
| D606,033 S | 12/2009 | Sonntag |
| D624,878 S | 10/2010 | Uneo et al. |
| 8,277,965 B2 | 10/2012 | Hermann et al. |
| 8,445,126 B2 | 5/2013 | Hermann |
| 8,535,104 B1 | 9/2013 | Nidia |
| 8,658,299 B2 | 2/2014 | Yang et al. |
| D761,729 S | 7/2016 | Leong |
| D772,185 S | 11/2016 | Moninski |
| 9,490,507 B2 | 11/2016 | Bandhauer et al. |
| D773,993 S | 12/2016 | Hoffman |
| D778,853 S | 2/2017 | Skowranek et al. |
| D784,258 S | 4/2017 | Vienna et al. |
| D785,567 S | 5/2017 | Abena et al. |
| D793,977 S | 8/2017 | Chung et al. |
| D795,215 S | 8/2017 | Huang et al. |
| D806,646 S | 1/2018 | DeKeuster |
| D830,299 S | 10/2018 | Banayan |
| D830,965 S | 10/2018 | Varatharajah et al. |
| D836,546 S | 12/2018 | Kang |
| D850,369 S | 1/2019 | Wang |
| D842,243 S | 3/2019 | Qiu |
| D845,234 S | 4/2019 | Gao |
| D845,894 S | 4/2019 | Clark |
| D851,033 S | 6/2019 | Yuk |
| D851,614 S | 6/2019 | Ji |
| D853,955 S | 7/2019 | Oliver |
| D853,956 S | 7/2019 | Lau |
| D853,962 S | 7/2019 | Kanarellis |
| D854,499 S | 7/2019 | Lilja |
| D861,593 S | 10/2019 | Nakajima |
| D883,207 S | 5/2020 | Sakamoto |
| D883,208 S | 5/2020 | Dong |
| D884,597 S | 5/2020 | Pilliod |
| D884,598 S | 5/2020 | Ebisawa |
| D884,612 S | 5/2020 | Lau |
| D884,629 S | 5/2020 | Zhong |
| D885,340 S | 5/2020 | Shum |
| D885,341 S | 5/2020 | Xu |
| D886,049 S | 6/2020 | Lee |
| D891,362 S | 7/2020 | Milroy et al. |
| D912,614 S | 3/2021 | Wurden et al. |
| 2006/0093901 A1 | 5/2006 | Lee |
| 2007/0141454 A1 | 6/2007 | Marukawa |
| 2008/0268333 A1 | 10/2008 | Barrella et al. |
| 2009/0017352 A1 | 1/2009 | Takahashi |
| 2011/0293973 A1 | 12/2011 | Kim |
| 2011/0300424 A1 | 12/2011 | Kim |
| 2012/0025766 A1 | 2/2012 | Reade |
| 2012/0214042 A1 | 8/2012 | Wiegert |
| 2012/0282497 A1 | 11/2012 | Yang et al. |
| 2014/0072844 A1 | 3/2014 | Oh |
| 2014/0370367 A1 | 12/2014 | Higuchi |
| 2015/0194643 A1* | 7/2015 | Smith .................. H01M 50/116 429/149 |
| 2015/0357692 A1 | 12/2015 | Piggott et al. |
| 2016/0043411 A1 | 2/2016 | Shirvanian et al. |
| 2016/0322616 A1 | 11/2016 | Chatroux et al. |
| 2016/0359210 A1 | 12/2016 | Hasegawa |
| 2017/0018750 A1* | 1/2017 | Wintner .............. H01M 10/653 |
| 2017/0214103 A1 | 7/2017 | Onnerud et al. |
| 2018/0019156 A1* | 1/2018 | Matos-Perez ........... C07C 65/30 |
| 2018/0316104 A1* | 11/2018 | Murakami ............. B23K 26/21 |
| 2019/0148700 A1 | 5/2019 | Milroy |
| 2019/0237889 A1 | 8/2019 | Peng |
| 2019/0326569 A1 | 10/2019 | Chi et al. |
| 2019/0356091 A1 | 11/2019 | Aridah |

FOREIGN PATENT DOCUMENTS

| | | |
|---|---|---|
| DE | 102013218674 | 3/2015 |
| DE | 102013017168 B4 | 7/2017 |
| EP | 2372828 | 10/2011 |
| EP | 2577768 | 12/2016 |
| JP | 2016-006780 | 1/2016 |
| KR | 1020120136888 | 12/2012 |
| WO | WO-2014021841 | 2/2014 |
| WO | WO-2018023050 | 2/2018 |

OTHER PUBLICATIONS

U.S. Appl. No. 29/675,807, filed Jan. 4, 2019, Wurden.
U.S. Appl. No. 29/675,807, filed Jan. 14, 2019, Wurden.
Maritime Propulsion, Powering the Maritime Industry, "Pure Watercraft Unveils Battery Pack," https://www.maritimepropulsion.com/news/pure-watercraft-unveils-battery-560733, Published Decemeber 13, 2018, 1 page.
International Search Report and Written Opinion for International Patent Application No. PCT/US2019/047350, Applicant: Wurden et al., dated Dec. 5, 2019, 14 pages.
Supplementary European Search Report for European Patent Application No. 19852653.5, Applicant: Pure Watercraft, Inc., dated Jul. 15, 2022, 9 pages.
Extended European Search Report and Written Opinion for European Patent Application No. 19852653.5, Applicant: Pure Watercraft, Inc., dated Jan. 10, 2023 / Jan. 25, 2023, 9 pages.

* cited by examiner

BATTERIES FOR ELECTRIC MARINE PROPULSION SYSTEMS, AND ASSOCIATED SYSTEMS AND METHODS

CROSS-REFERENCE TO RELATED APPLICATIONS

The present application claims priority to U.S. Provisional Application No. 62/792,215, filed Jan. 14, 2019, to U.S. Provisional Application No. 62/720,926, filed Aug. 21, 2018, and to U.S. Provisional Application No. 62/720,922, filed Aug. 21, 2018, each of which is incorporated herein by reference in its entirety and made part of the present disclosure.

TECHNICAL FIELD

The present technology is directed generally to batteries for electric marine propulsion systems (among other applications), and associated systems and methods.

BACKGROUND

Outboard motors have been used for many years to propel smaller boats and other watercraft. Conventional outboard motors typically include a two-stroke or four-stroke internal combustion engine. More recently, in response to consumer demand for quieter and more environmentally friendly outboard motors, manufacturers have begun producing electric outboard motors.

Generating power for electrically driven outboard motors presents several challenges. For example, the batteries required to provide the power can be heavy, which can make installation and/or recharging tasks challenging. In some cases, the batteries and/or associated connections are susceptible to corrosion. In addition, the batteries can be susceptible to catastrophic failure from thermal runaway events within the battery pack. Accordingly, there remains a need in the industry for improved batteries, suitable for electric boat power, and/or other high-demand power installations.

DETAILED DESCRIPTION

The present technology is directed generally to batteries suitable for electric marine propulsion systems (among other applications), and associated systems and methods. In some embodiments, the batteries include features specifically configured to increase the durability of the batteries, inhibit corrosion, reduce the risk of catastrophic failure of the batteries, improve heat distribution from the battery cells, reduce manufacturing costs of the batteries, and/or reduce the weight of the batteries.

Figure 1:
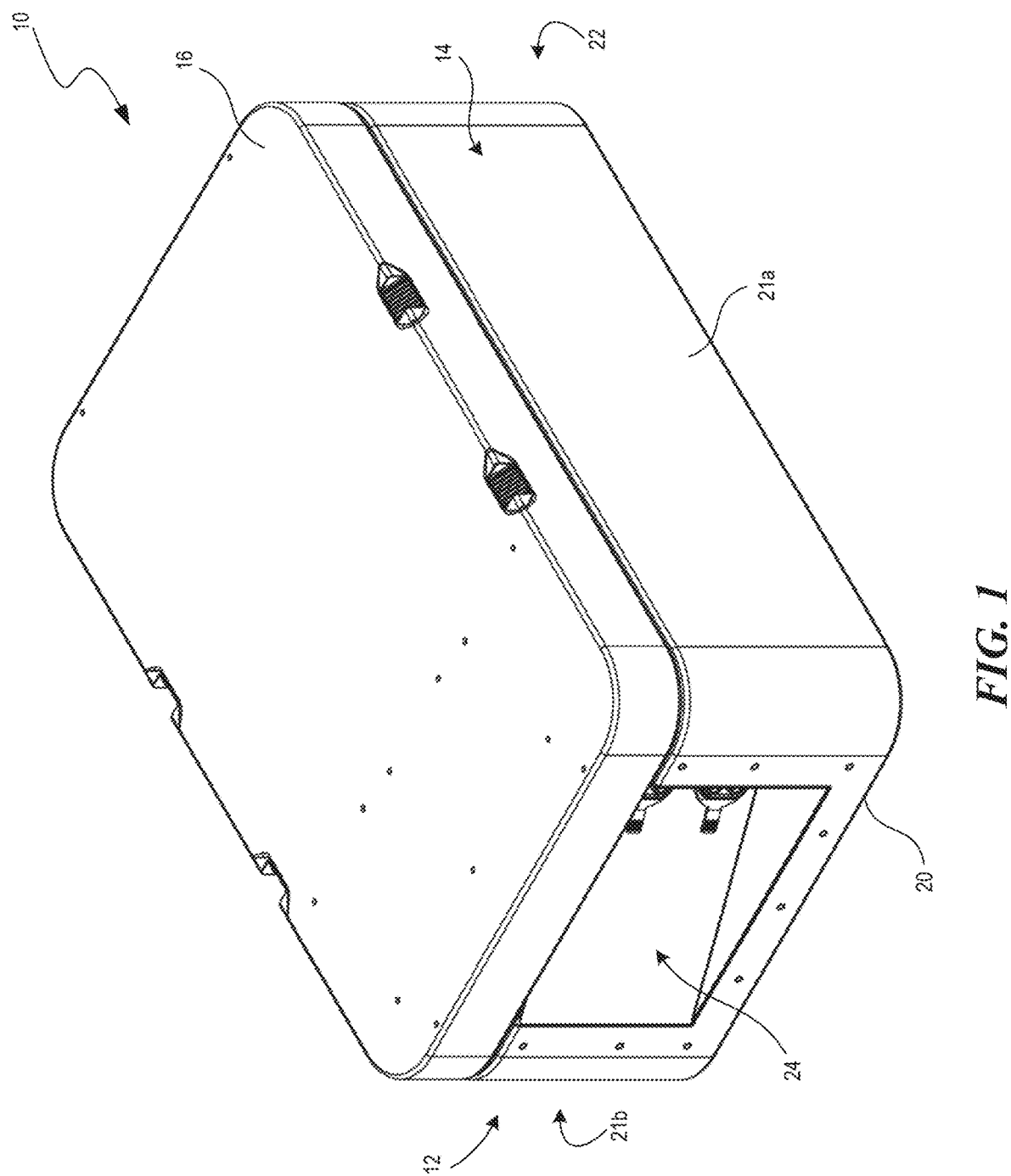
FIG. 1 illustrates a top, right, front perspective view of an embodiment of a battery pack.

Specific details of several embodiments of the present technology are described below with reference to particular battery/battery pack configurations to provide a thorough understanding of the relevant components. In other embodiments, the technology can be applied to batteries/battery packs having other configurations. Several details describing structures and/or processes that are well-known and often associated with batteries, outboard motors and/or electric motors, but that may unnecessarily obscure some significant aspects of the present technology, are not set forth in the following description for purposes of clarity. Moreover, although the following disclosure sets forth several embodiments of the present technology, several other embodiments of the technology have different configurations or different components than those described in this section. As such, the present technology may have other embodiments, with additional elements and/or without several of the elements described below with reference to FIGS. 1-21. In FIGS. 1-21, features may not necessarily be drawn to scale, and certain features may be emphasized or omitted for purposes of clarity FIG. 1 illustrates a representative battery pack 10. The battery pack 10 can include an enclosure 12. As illustrated, the enclosure 12 can include a main body 14 and an upper portion 16. The upper portion 16 can be, for example, a lid or other mechanism used to close the top of the enclosure 12. The enclosure 12 can be configured to contain, protect, and/or hide one or more battery cells from an external environment. In some embodiments, all or a portion of the enclosure 12 is watertight. The enclosure 12 can include one or more valves configured to permit pressure release from an interior of the enclosure 12. In some embodiments, the enclosure 12, or some portion of the enclosure 12, is constructed from an insulating material. In some embodiments, the enclosure 12, or some portion of the enclosure, is constructed from a conductive material.

In some embodiments, the enclosure 12 includes a main body cover 18 (FIG. 11) positioned between the main body 14 and the upper portion 16. The main body cover 18 can define an upper wall of the main body 14 of the enclosure 12. The enclosure 12 can include a front wall 20 and a rear wall 22 opposite the front wall 20. Two side walls 21a, 21b can extend between the front wall 20 and the rear wall 22. In some embodiments, the front wall 20 includes a recess 24. Additional or alternative recesses may be positioned within one or more of the side walls 21a, 21b and/or the rear wall 22.

Figure 2:
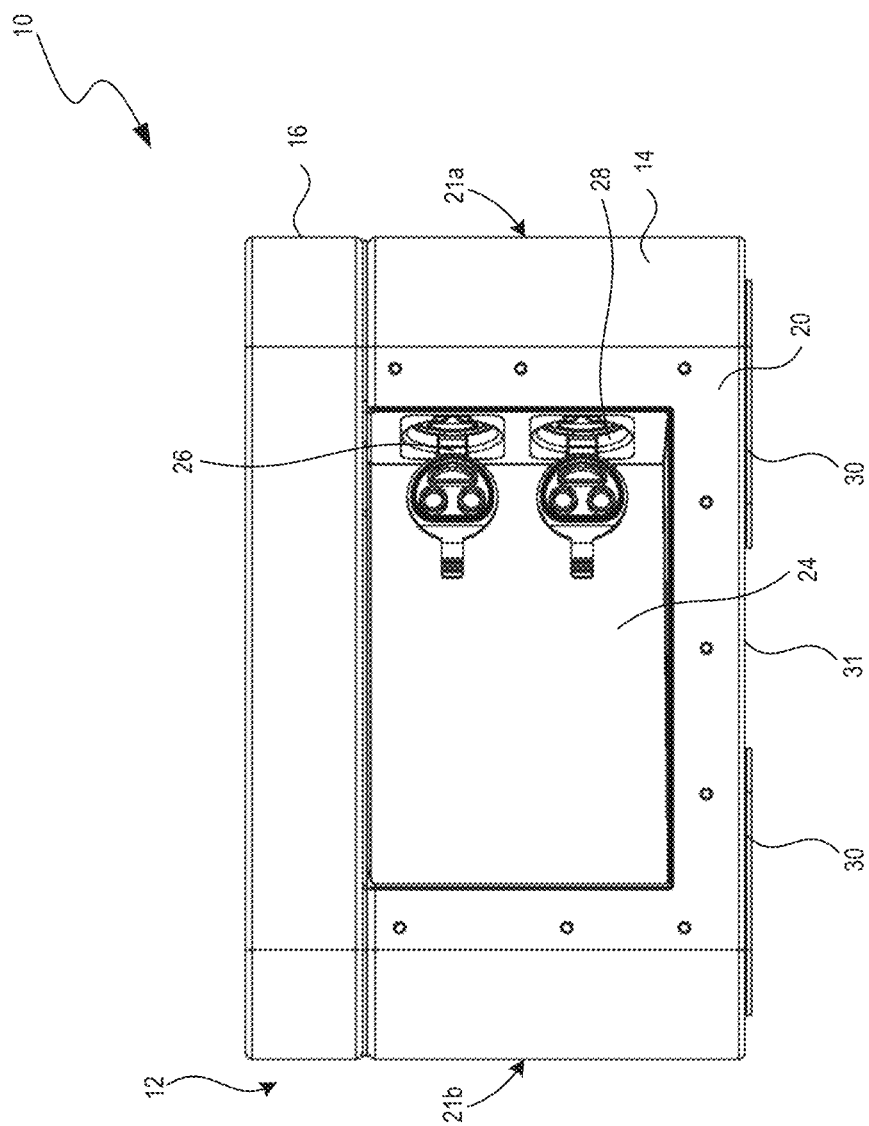
FIG. 2 illustrates a front view of the battery pack of FIG. 1.
Figure 3:
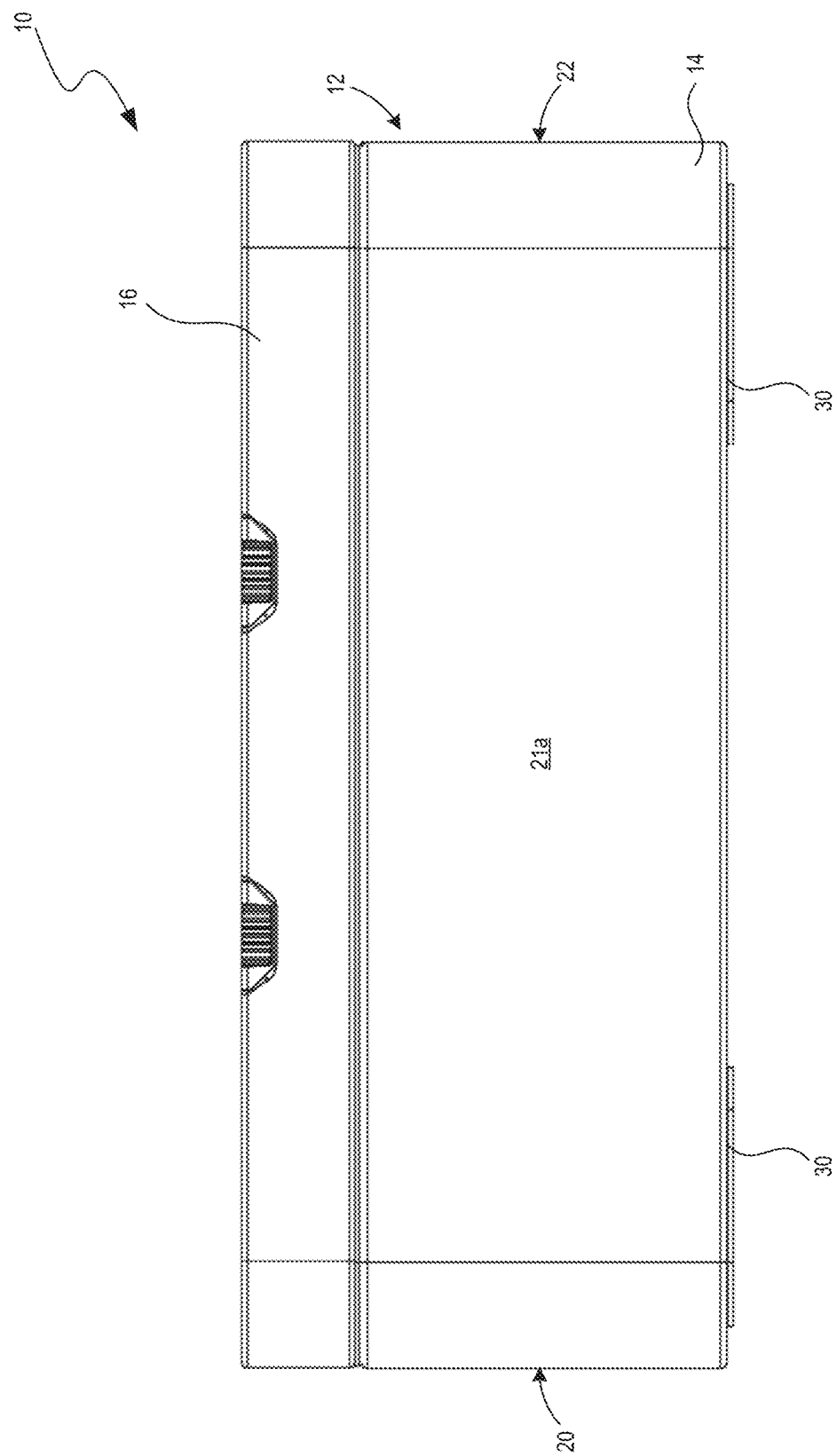
FIG. 3 illustrates a right-side view of the battery pack of FIG. 1.
Figure 4:
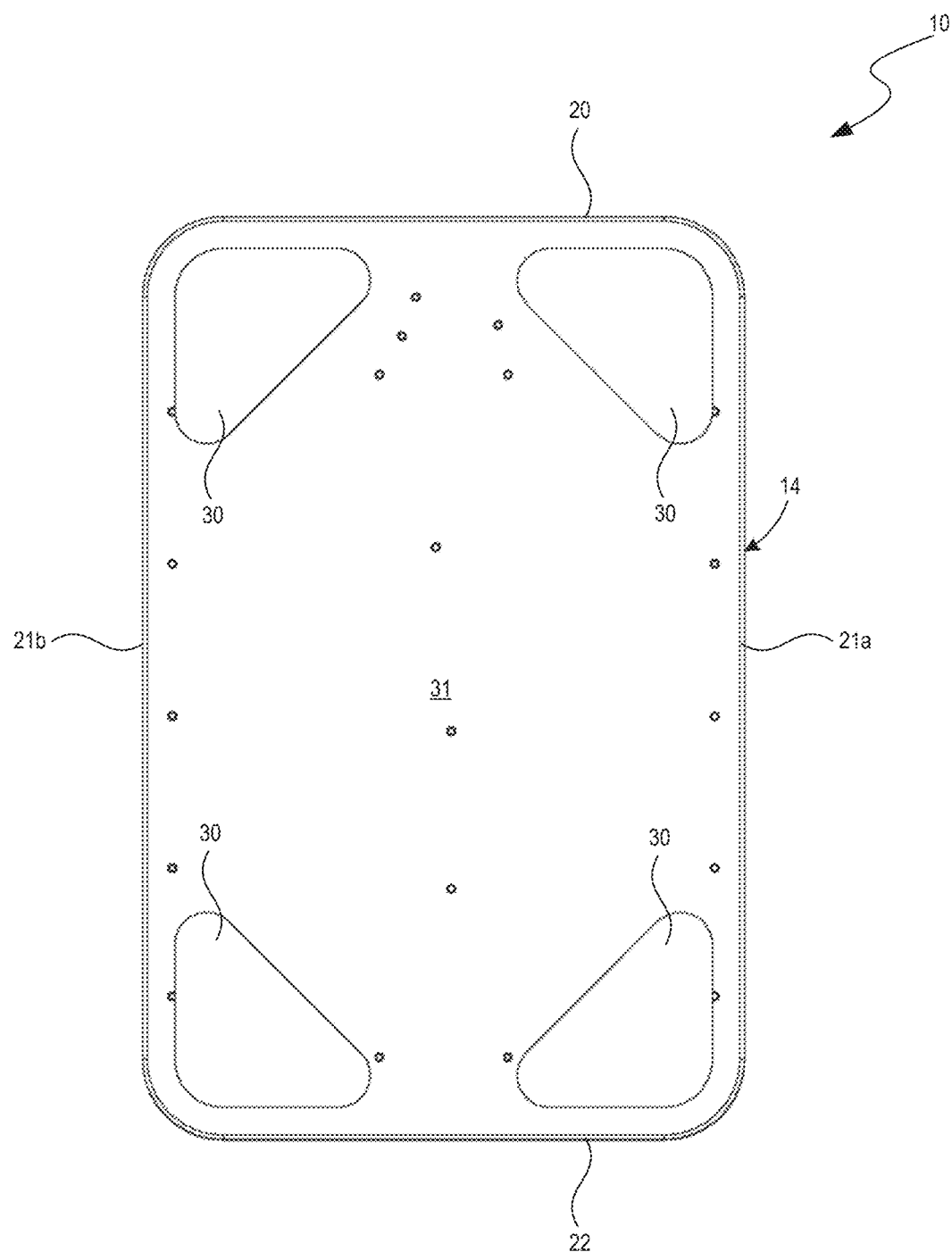
FIG. 4 illustrates a bottom view of the battery pack of FIG. 1.

As illustrated in FIG. 2, the recess 24 (or some other portion of the enclosure 12) can include one or more connector ports. For example, as illustrated, the enclosure 12 can include a first battery connector 26, and a second battery connector 28, positioned at least partially within the recess 24. In some embodiments, the main body portion 14 and/or upper portion 16 can include additional connection ports on other walls. The enclosure 12 can include one or more feet 30 or other protrusions extending from the bottom side 31 of the enclosure 12. These feet 30 can be configured to space the bottom wall 31 of the enclosure 12 from a floor, deck, or other surface on which the battery pack 10 is set. As illustrated in FIGS. 3-4, the enclosure 12 may include two, three, four, or more feet 30.

Figure 5:
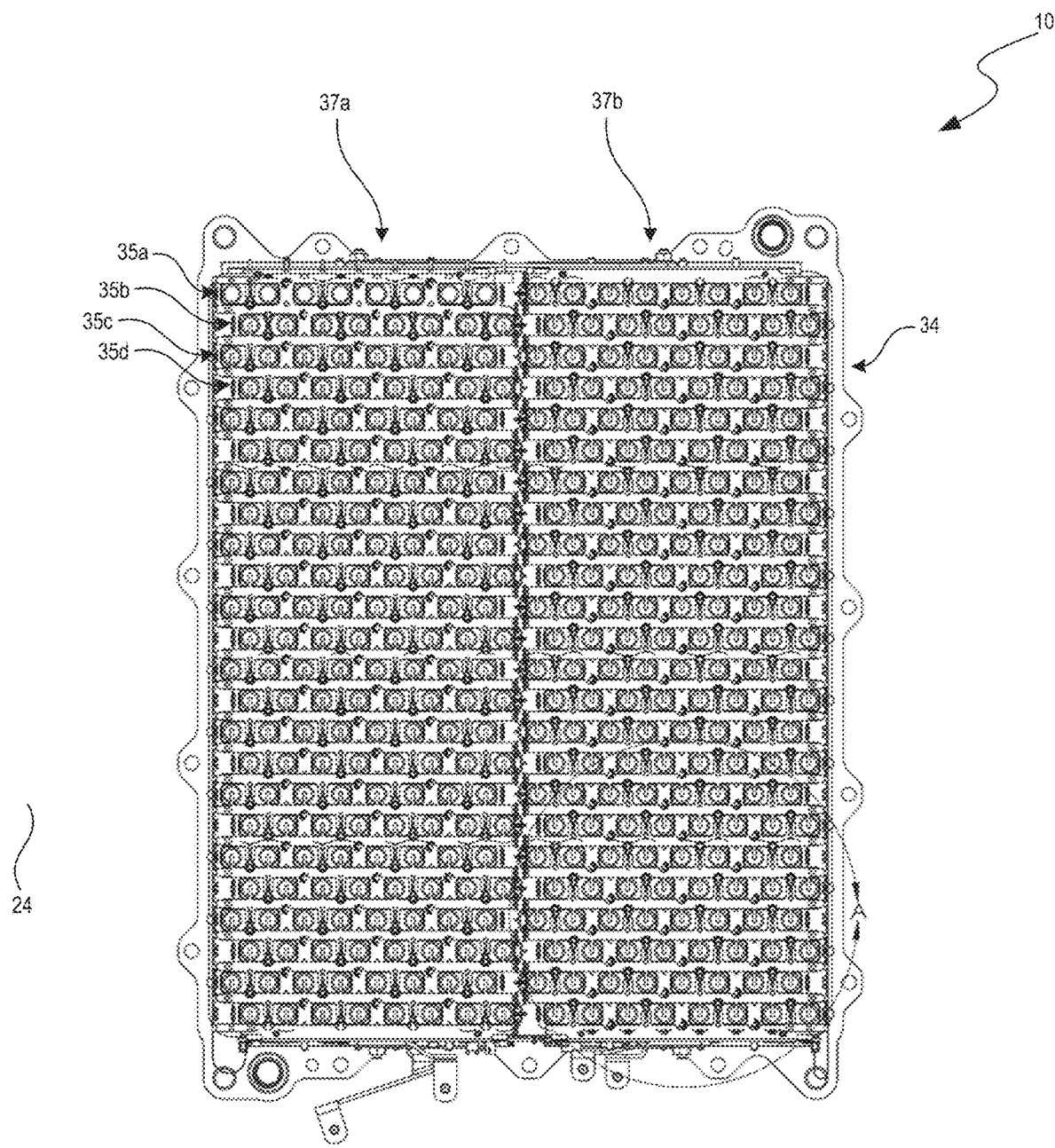
FIG. 5 illustrates a top plan view of the battery pack of FIG. 1 with the top cover and main body cover removed.

FIG. 5 illustrates the battery pack 10 with the lid 16 and top wall of the enclosure 12 removed. As illustrated, the battery pack 10 can house one or more battery assemblies (e.g., battery modules) 34. Each battery assembly 34 can include one or more battery cells. The battery cells can be arranged in rows (e.g., rows as observed looking downward through the top of the enclosure 12). For example, four rows of battery cells 35a, 35b, 35c, and 35d are labelled in FIG. 5. In some embodiments, the battery pack 10 can include between 10-50 rows, between 15-45 rows, between 20-60 rows, and/or between 18-30 rows of battery cells. Larger and smaller numbers of rows are also possible, as the technology described herein can scale over a large range of rows. In the illustrated embodiment, 24 rows of battery cells 36 are included. The battery cells and battery assemblies can be arranged in one or more columns within the enclosure 12. In the illustrated embodiment, the cells are arranged in two columns 37a, 37b. In some embodiments, three or more columns may be used.

Figure 6:
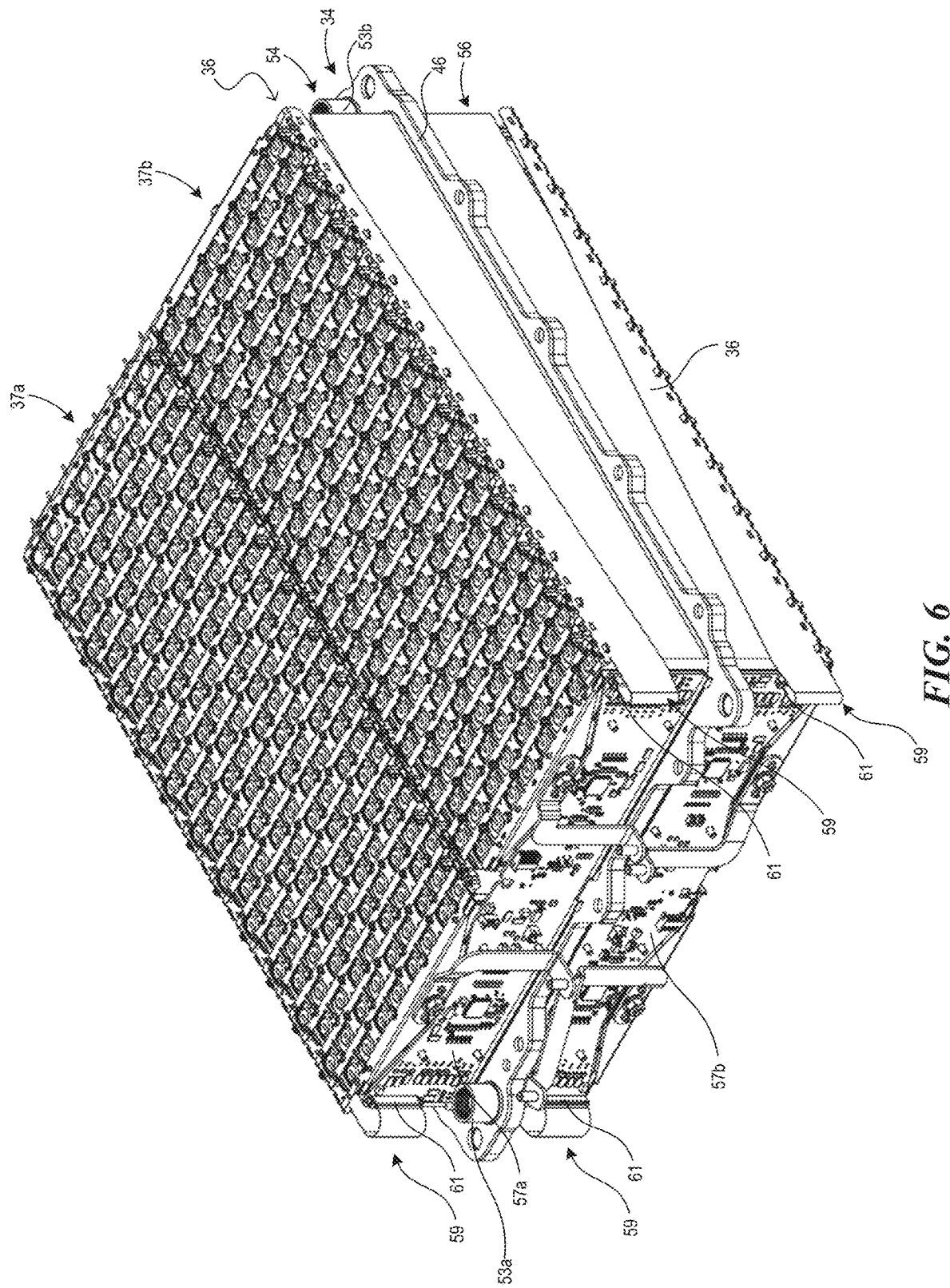
FIG. 6 illustrates a top, front, right perspective view of an embodiment of a battery assembly.

As illustrated in FIG. 6, each battery assembly 34 can comprise a plurality of battery cells 36. The battery assembly 34 can include an upper cell array 54 and a lower cell array 56 positioned below the upper cell array 54. In some embodiments, a cold plate 46 is positioned between the upper and lower cell arrays 54, 56. The cold plate 46 can overlap all or a portion of one or both of the upper and lower cell arrays 54, 56 when observed from above (e.g., from the point of view of FIG. 5).

The battery assembly 34 can include a harness assembly configured to surround at least a portion of the battery assembly 34. The harness assembly can include one or more circuit boards. For example, the battery assembly 34 can include an upper circuit board 57a and a lower circuit board 57b. The circuit boards 57a, 57b can be positioned on an end of the battery assembly 34. As illustrated, the circuit boards 57a, 57b can be positioned at a front end of the battery assembly 34 (e.g., an end closest to the front wall 20 when the battery assembly 34 is positioned in the enclosure 12).

The harness assembly can include a plurality of leads 59 extending from the circuit boards 57a, 57b to the collector strips 40. In some embodiments, identical leads 59 and associated structures can be used for both the upper and lower cell arrays 54, 56. Use of identical leads 59 can be facilitated by use of identical collector strips 40. The connections between the leads 59 and the collector strips 40 is discussed in more detail below with respect to FIG. 10. The leads 59 can be connected to the circuit boards 57a, 57b via connectors 61 (e.g., terminals, busses, external interfaces, etc.). Via the connections between the collector strips 40 and the circuit boards 57a, 57b, the harness assembly can be configured to monitor the voltages of the battery cells 36 (e.g., the rows of battery cells). The harness assembly can be configured to balance voltages of the battery cells 36 and to monitor charge of the cells 36. By monitoring the voltages of the battery cells 36, the harness assembly can identify failures (e.g., disconnections between the collector strips 40 and cells 36, dead cells 36, etc.) in the battery assembly 34.

Figure 7:
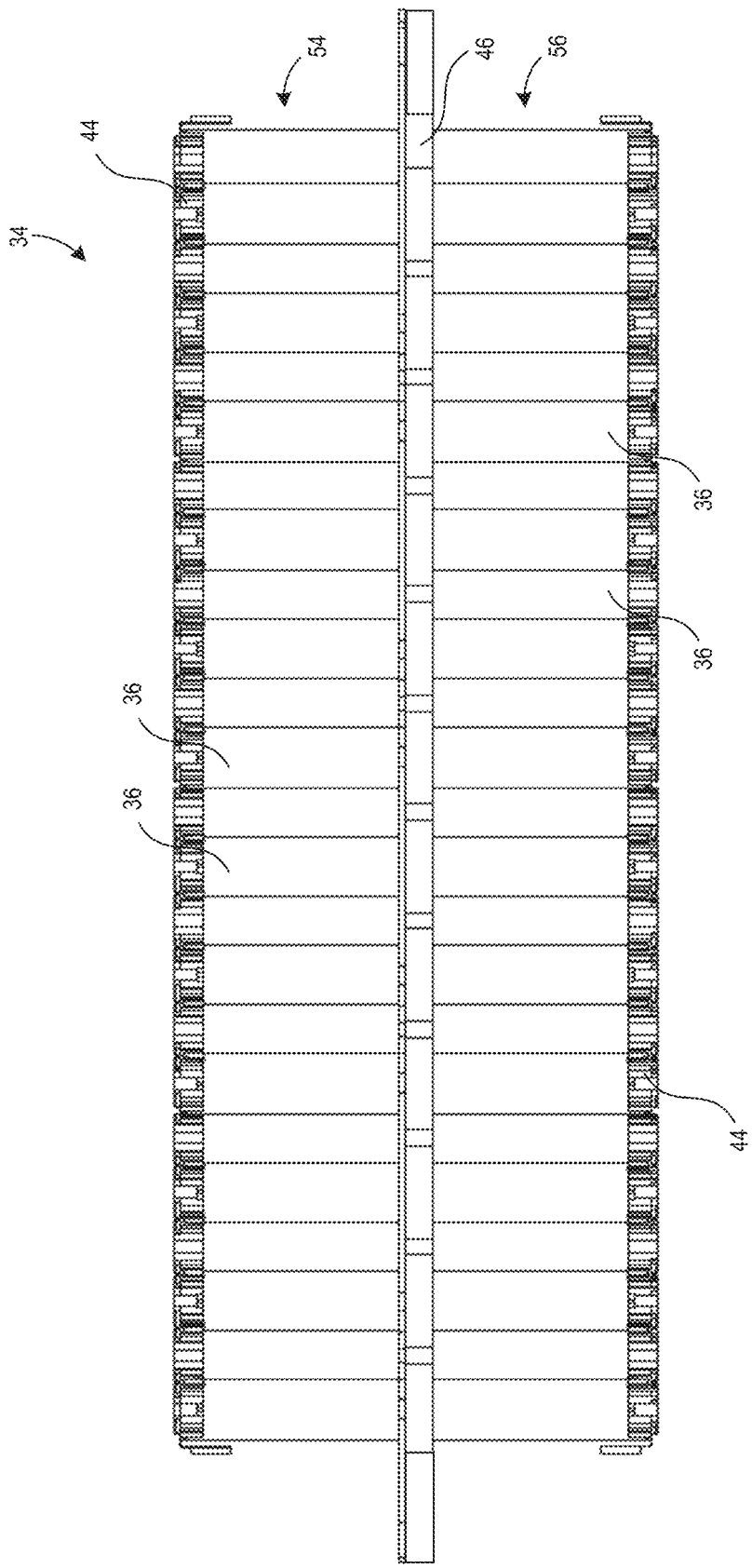
FIG. 7 illustrates a right-side view of the battery assembly of FIG. 6.

As illustrated in FIG. 7, the battery assembly 34 can include one or more insulators 44. The insulators 44 can be positioned at or near the ends of the battery cells 36 opposite the cold plate 46. In some embodiments, the insulators 44 are positioned at or near the ends of the battery cells 36 having anodes and cathodes. The battery cells 36 in one or both of the upper and lower cell arrays 54, 56 can be aligned vertically within the enclosure 12 when the enclosure 12 is set upon a flat horizontal surface.

Figure 8:
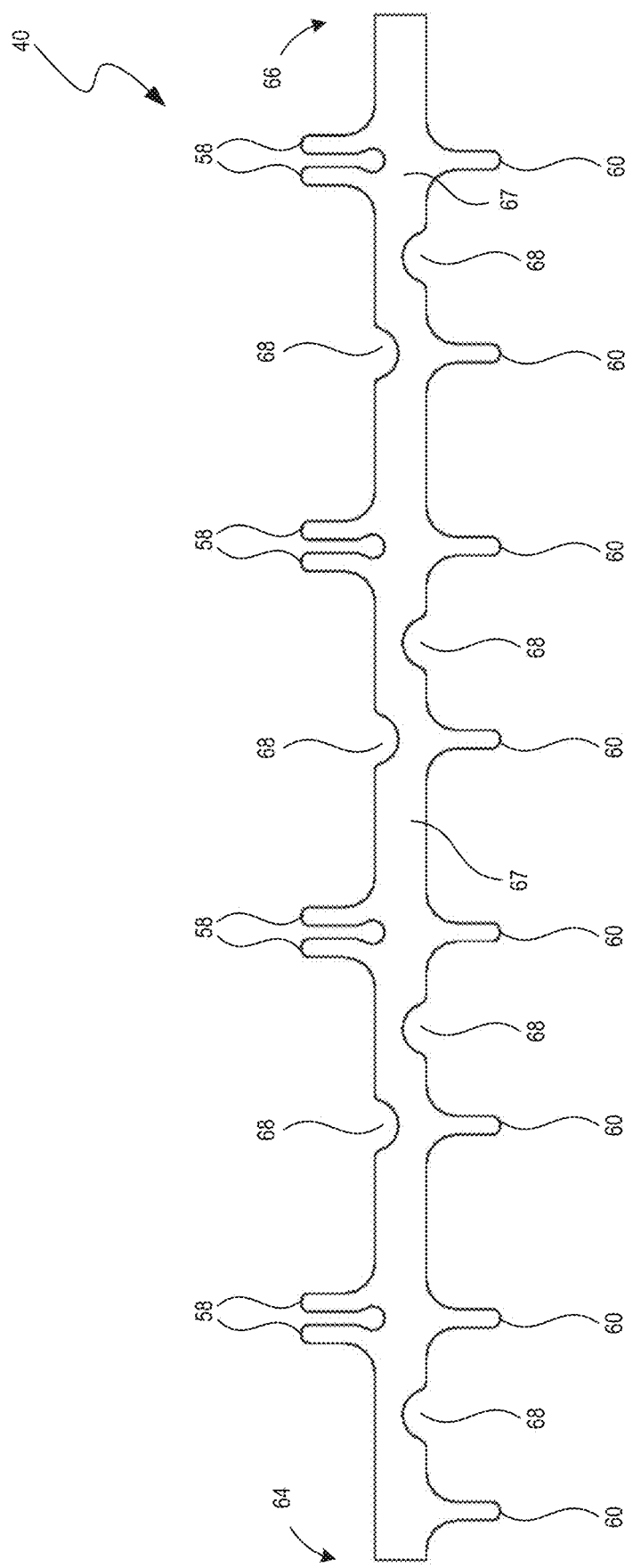
FIG. 8 illustrates a top plan view of a collector strip.

FIG. 8 illustrates a representative collector or collector strip 40. The collector strip 40 can include a first end 64, a second end 66, and a collector body 67 extending between the first and second end 66s. In some embodiments, anode prongs 58 extend in a first direction from the collector body 67. Cathode prongs 60 can extend from the collector body 67 in a direction opposite the anode prongs 58. In some embodiments, anode and cathode prongs 58, 60 extend in the same direction. The collector body 67 can include one or more alignment features 68. For example, the alignment features 68 can include cut-outs, indentations, prongs, protrusions, or other physical features configured to facilitate alignment of the collector strip 40 with respect to the battery cells 36. In the illustrated embodiment, the anode prongs 58 extend in pairs from the collector body 67. In some embodiments, the anode prongs 58 are spaced further from each other, and/or distributed more uniformly along the length of the collector strip 40.

Figure 8A:
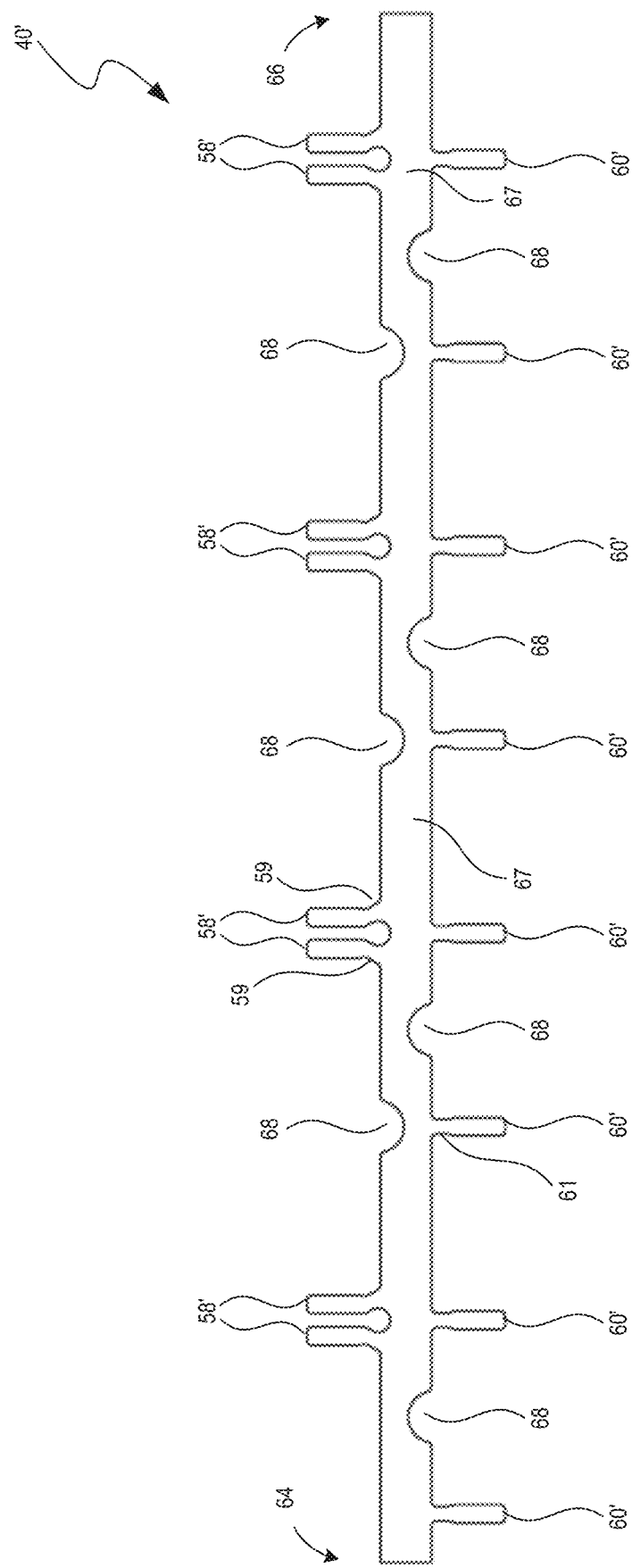
FIG. 8A illustrates a top plan view of a collector strip with necking on the prongs.

FIG. 8A illustrates an embodiment of a collector strip 40' having anode prongs 58' and cathode prongs 60'. The overall layout and features of the collector strip 40' are the same as those of the collector strip 40 described above, as indicated by like reference numbers. One difference between the two embodiments is that one or more of the prongs of the collector strip 40' can have a necked portion. For example, one or more of the anode prongs 58' includes a necked (e.g., thinned) portion 59. In some embodiments, one or more of the cathode prongs 60' includes a necked portion 61. The necked portions 59, 61 can be positioned along the length(s) of the prong(s) 58', 60' at or near the collector body 67. The necked portions 59, 61 can increase the flexibility of the prong(s). Increasing the flexibility of the prongs can reduce the likelihood that the prongs unintentionally disconnect from their respective anodes or cathodes after attachment. In some embodiments, the necked portions 59, 61 can be used as fuses (e.g., can function as fuses) in the connection to the cells and/or to other portions of the battery pack 10.

Figure 8B:
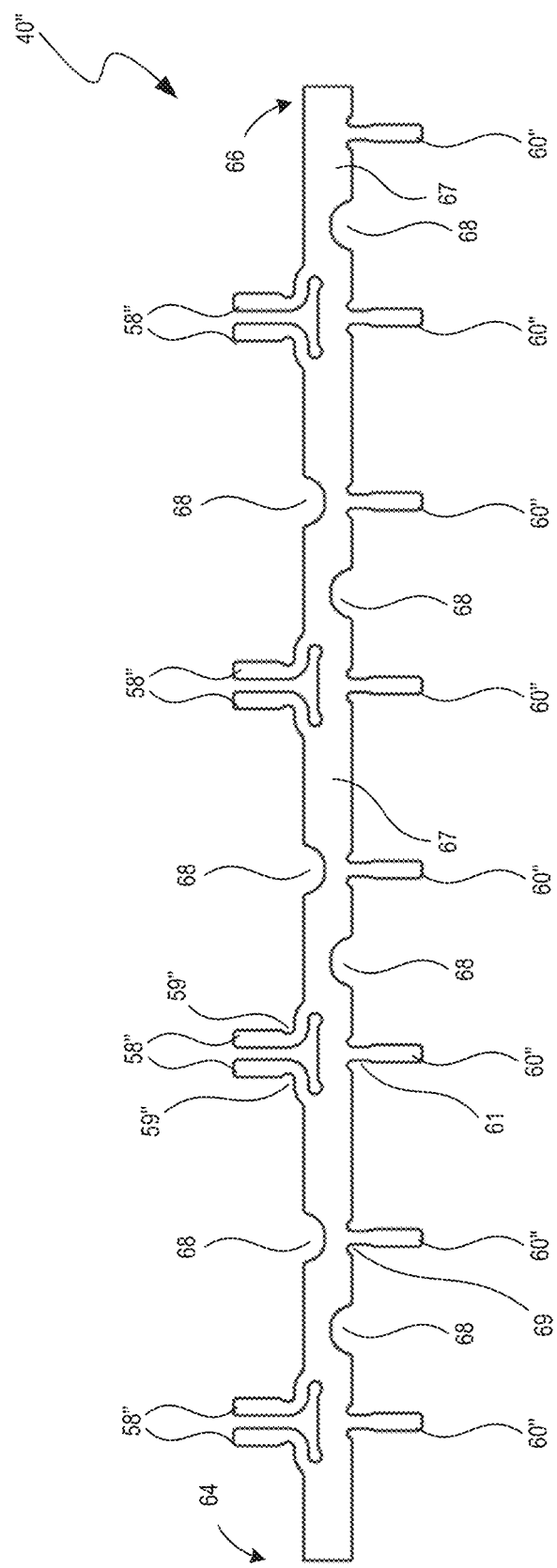
FIG. 8B illustrates a top plan view of a collector strip with necking on the prongs and recesses formed behind one or more of the prongs.

FIG. 8B illustrates an embodiment of a collector strip 40" having anode prongs 58" and cathode prongs 60". The overall layout and features of the collector strip 40" are the same as those of the collector strips 40, 40' described above, as indicated by like reference numbers. One difference between the collector strip 40" of FIG. 8B and the previously-described collector strips is recesses 69 formed into the collector body 67 on one or both sides of one or more of the cathode prongs 60". In some embodiments, the collector strip 40" includes one or more anode recesses 71 formed in the collector body 67 between and/or behind the pairs of anode prongs 58". For example, the anode recesses 71 can have a general "T" or "Y" shape, wherein the upper branches of the recesses 71 at least partially between the anode prongs 58" and the cathode prongs 60". These recesses 69, 71 can increase flexibility of the respective prongs 58", 60". Increasing the flexibility of the prongs can reduce the likelihood that the prongs unintentionally disconnect from their respective anodes or cathodes after attachment.

Figure 9:
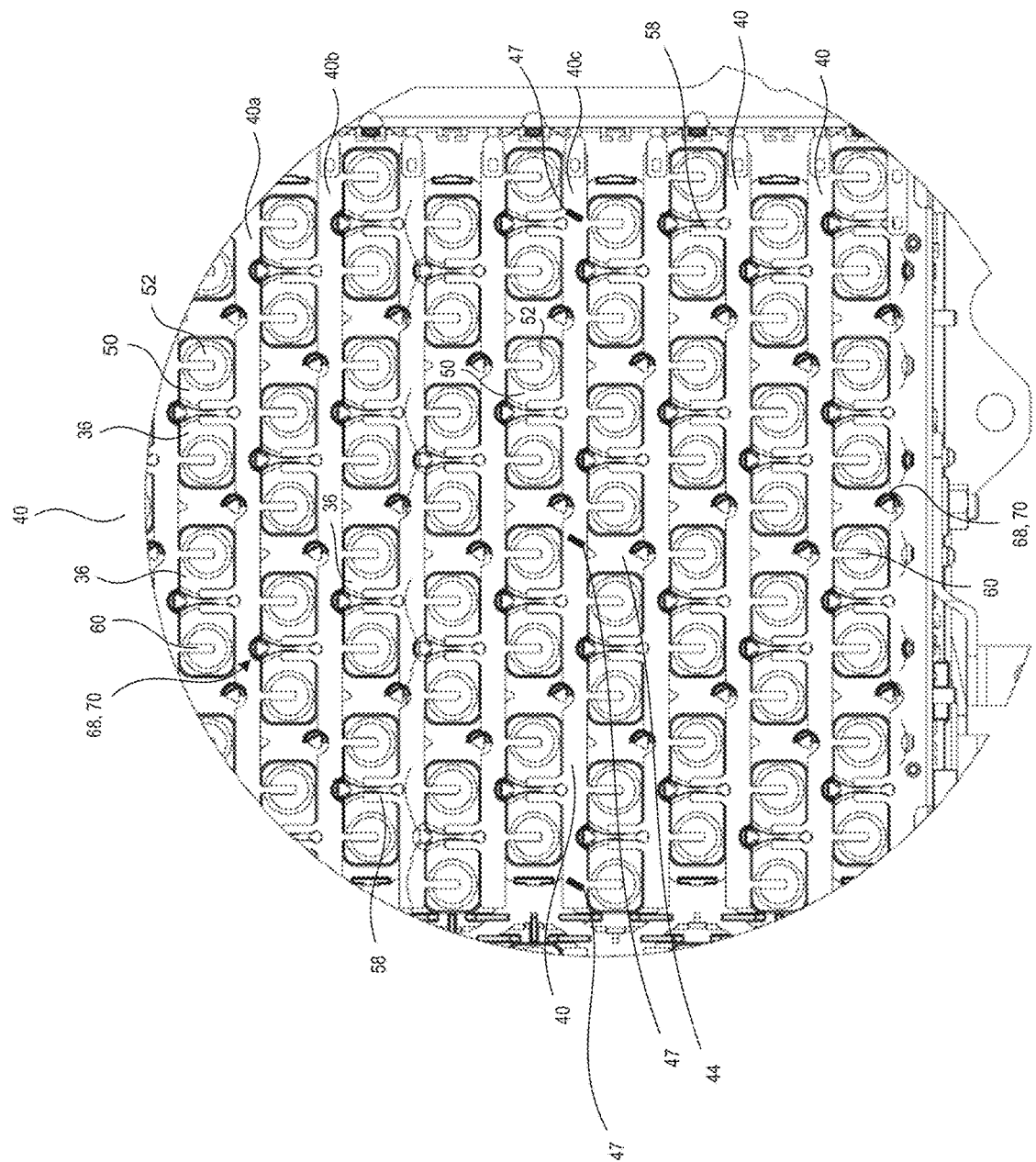
FIG. 9 illustrates a close-up top plan view of a portion of the battery assembly of FIG. 6.

As illustrated in FIG. 9, the collector strips 40 can be arranged in parallel to each other. For example, a first collector strip 40a in a first orientation can be alternated with a second collector strip 40b in a second orientation. In some embodiments, the same collector geometry is used for both the first and second orientations with the second orientation being a mirror image of the first orientation but flipped about an axis perpendicular to the length of the collector strip 40. In some embodiments, every other connector strip 40, when counted in a direction perpendicular to the collector strips 40 and to the length of the battery cells 36 (e.g., up and down in the orientation of FIGS. 5 and 9) is identical in both geometry and orientation. In some embodiments, the same collector strip geometries are utilized for both the upper and lower cell arrays 54, 56. Use of a single geometry for all or most of the collector strips 40 can reduce the manufacturing costs, overhead costs, and other costs associated with manufacturing and/or repairing the battery packs 10. In some embodiments, all or most of the collector strips 40 can be aligned such that their respective ends line up adjacent each other. In other words, the ends of each of the collector strips 40 on each side of the battery assembly 34 can lie on a same line extending perpendicular to the lengths of the collector strips 40 when the battery assembly 34 is assembled.

The collector strips 40 can be arranged such that none of the collector strips 40 overlap each other in a direction parallel to the lengths of the battery cells 36. Put another way, the collector strips 40 can be arranged such that they are not stacked on top of each other. By not stacking the collector strips 40, the battery assemblies 34 of the present disclosure can allow for easy replacement and/or repair of one collector strip 40 without interference with other collector strips 40.

The cathode prongs 60 of the collector strips 40 can be configured to connect to the cathodes 52 of the battery cells 36, while the anode prongs 58 are configured to be connected to the anodes 50 of the respective battery cells 36. In the illustrated embodiment, both the anode 50 and cathode 52 of each battery cell 36 are positioned on a same end of the battery cell 36 (e.g., on the end opposite the cold plate 46). The insulators 44 can be positioned between the collector strips 40 and their respective battery cells 36. In some embodiments, the prongs 58, 60 are deflected toward the cathodes and anodes of the battery cells 36 when the prongs are connected (e.g., welded) to the cathodes and anodes (see FIGS. 20-21). Deflection of the prongs toward the cathodes/anodes can provide visual warning if a prong disconnects form a cathode or anode, as the disconnected prong would deflect (e.g., spring) away from the anode/cathode. In some embodiments, deflecting a prong away from the anode/cathode can provide visual evidence of a bad weld. Welding or otherwise connecting the collector strips 40 to the battery cells 36 can retain the insulators 44 between the collector strips 40 and the battery cells 36. Retaining the insulators 44 between the collector strips 40 and the battery cells 36 can reduce or eliminate the need for additional adhesive or other connection material between the insulators 44 and the battery cells 36.

Figure 10:
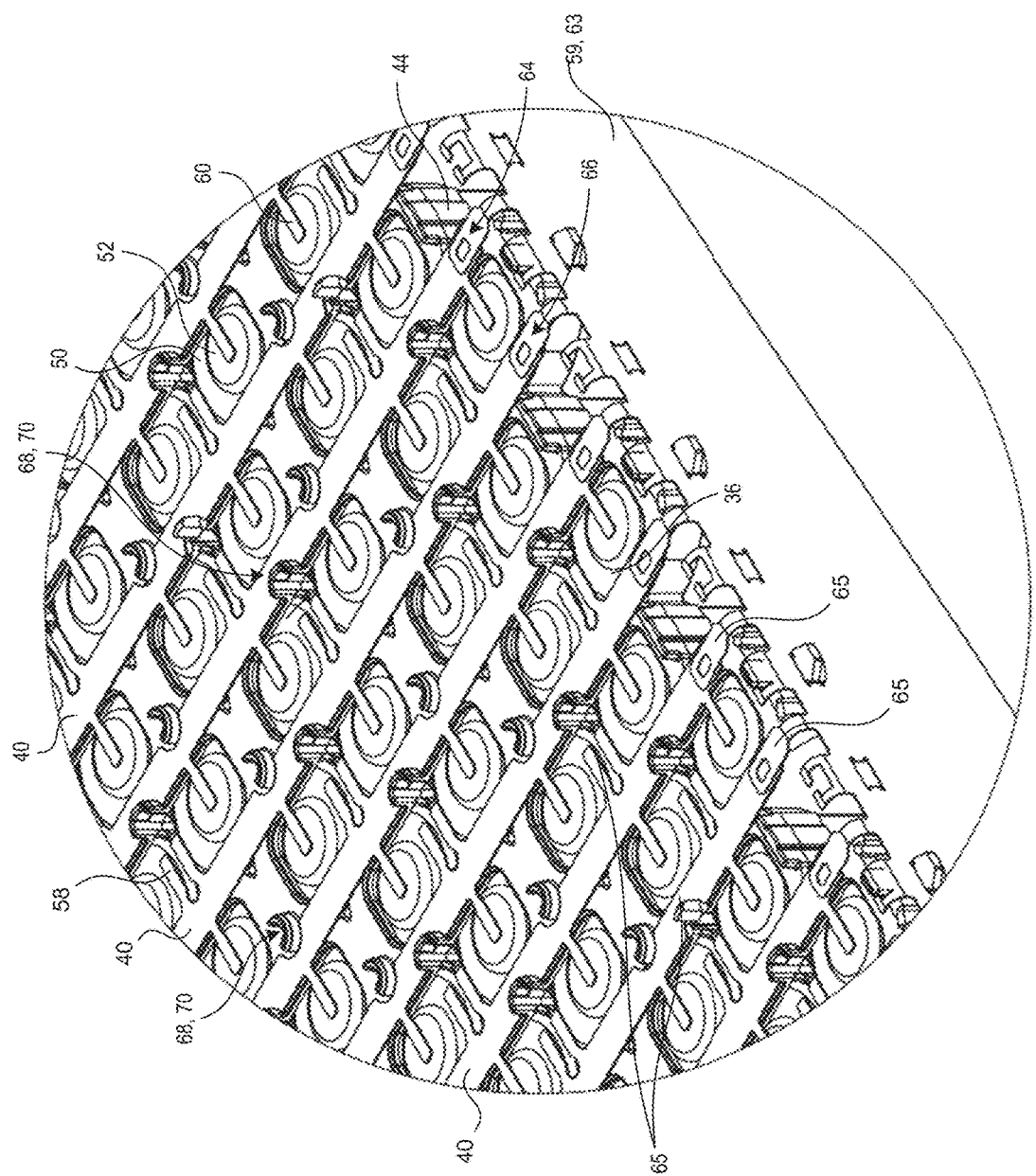
FIG. 10 illustrates a close-up top, front, right perspective view of the battery assembly of FIG. 6.

As illustrated in FIG. 10, each of the prongs (e.g., cathode and anode prongs 58, 60) is positioned away from an end or edge of the cell array. Specifically, none of the prongs in the illustrated embodiment are positioned on an edge of a battery cell 36 (e.g., an anode 50 of a battery cell 36) at the end of a row of cells. Spacing the prongs away from an end of the rows of cells can reduce the likelihood that the prongs are damaged during shipment or use of the battery pack 10.

In some embodiments, the alignment features 68 of the collector strip 40 are configured to engage with corresponding alignment features 70 of the insulator 44. As illustrated, the alignment features 70 of the insulator 44 can include protrusions, clips or other features configured to engage with the collector strips 40 to align the collector strips 40 along the cells 36 and insulator 44.

As illustrated, the leads 59 of the harness assembly can be connected (e.g., embedded, printed onto, etc.) to an elongate strip 63. Tabs 65 (e.g., conductive tabs) can extend between the leads 59 and the collector strips 40. For example, the tabs 65 can be bent (e.g., at a right angle) between the leads 59 and the collector strips 40. In some embodiments, identical tabs 65 can be used for each lead-collector strip connection. The use of identical tabs 65 can be facilitated by the use of identical collector strips 40 that are aligned in parallel and whose ends are aligned as described above with respect to FIG. 9. Using identical tabs 65 can reduce manufacturing and/or overhead costs.

Referring back to FIG. 9, in some embodiments, the collector strips 40 can be initially welded to the insulators 44 in several select locations prior to attachment of the collector strips 40 to the anodes/cathodes of the cells 36. For example, weld points 47 near the ends of the collector strips 40 (e.g., strip 40c) and/or near the center of the collector strips 40 may be formed to hold the collector strips 40 in place during attachment/welding of the prongs of the collector strips 40 to the cells 36. Utilizing these weld points 47 can reduce the cost of manufacturing the battery pack by reducing the need to otherwise hold the collector strips 40 in place with respect to the cells 36. In some embodiments, the weld points 47 are formed at angles parallel to or perpendicular to the length of the collector strips 40. In some embodiments, the weld points 47 are formed at a transverse angle with respect to the length of the collector strips 40. For example, the weld points 47 can be generated at an angle between 10°-45°, between 15°-60°, between 20°-50°, between 40°-80°, and/or between 30°-60° with respect to the length of the collector strip 40. Forming the weld points 47 at an angle reduces stress input on the collector strips 40 in direction parallel to and/or perpendicular to the lengths of the collector strips 40, which can reduce the likelihood that the collector strips 40 become misaligned with respect to the insulators 44 during forming of the weld points 47. In some embodiments, the harness assembly is connected to the collector strips 40 prior to connecting the collector strips 40 to the cells 36. In some other embodiments, the collector strips 40 are connected to the cells 36 before the harness assembly is connected to the collector strips 40.

Figure 10A:
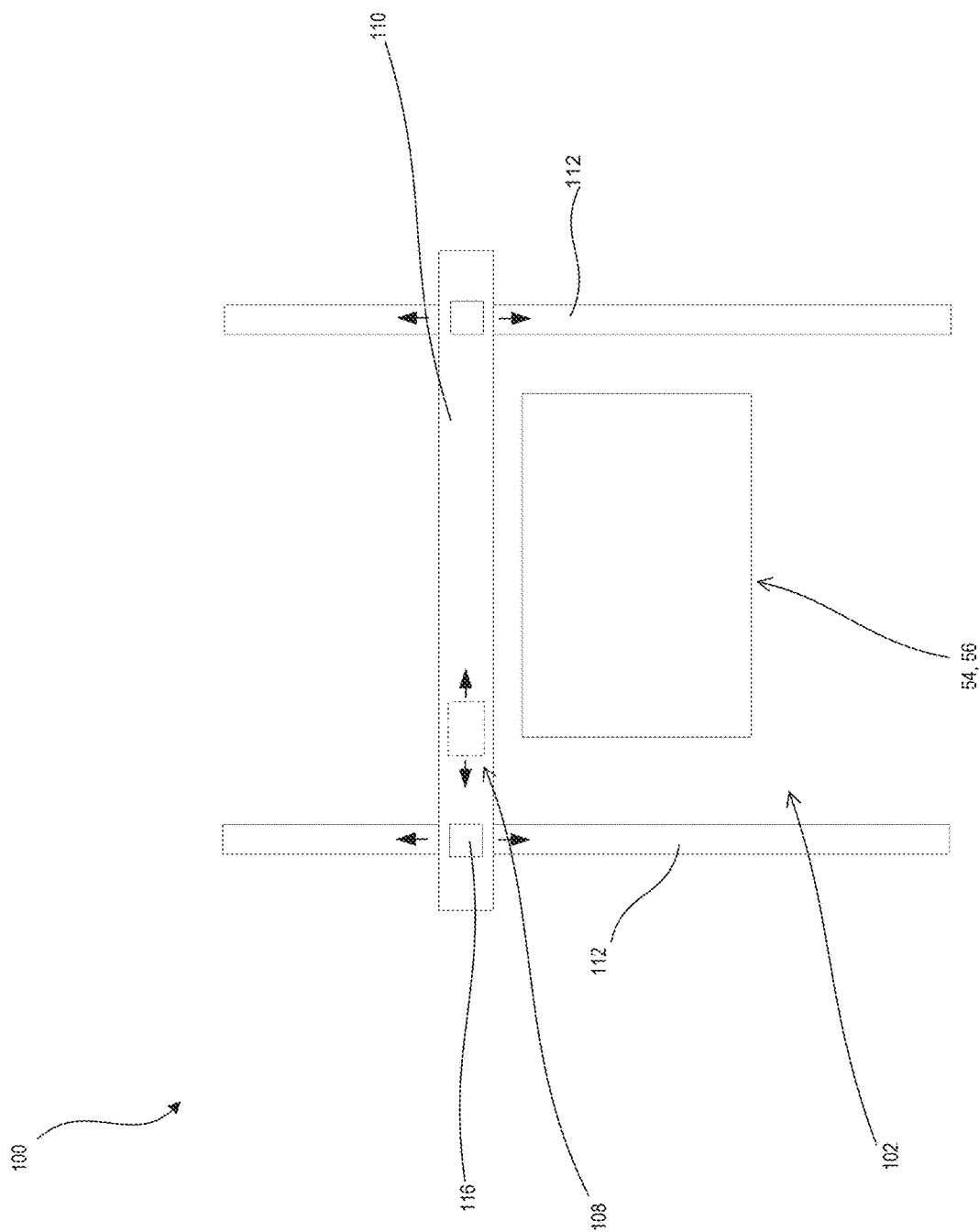
FIG. 10A illustrates a schematic representation of a welding apparatus.

FIG. 10A illustrates a schematic example of a welding apparatus 100 that may be used to connect to the collector strips 40 to one or both of the insulators 44 and the cells 36. The welding apparatus 100 can include an operative area 102 in which a cell array 54, 56 can be placed for welding. The welding apparatus 100 can include a welding head 108 or other welding mechanism configured to perform the welding functions. The welding head 108 can be positioned on a first track 110 or other support structure configured to permit movement of the welding head 108 in at least a first direction. The first track 110 can be supported on one or more secondary tracks 112 configured to allow the first track 110 (and thereby the welding head 108) to move in a direction transverse or perpendicular to the first direction. The welding apparatus 100 can include one or more actuating mechanisms 116 configured to actuate movement of the welding head 108 along one or both of the first track 110 and secondary tracks 112. The welding apparatus 100 preferably includes further actuators configured to facilitate movement of the welding head 108 in a vertical direction (e.g., vertical in the frame of reference of FIG. 10A) and/or rotational/tilting of the welding head 108.

Figure 11:
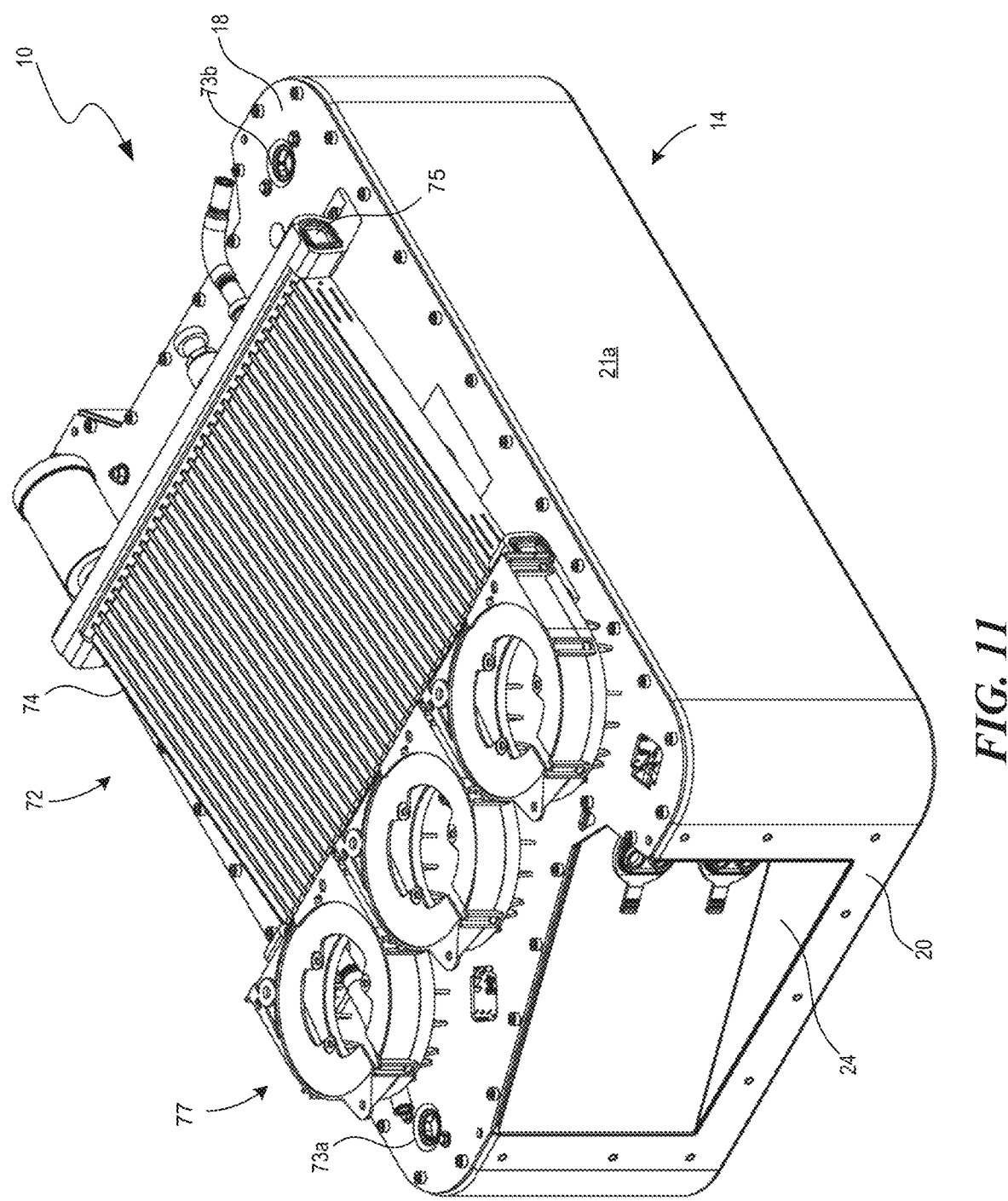
FIG. 11 illustrates a top, front, right perspective view of the battery pack of FIG. 1 with the top cover removed.

FIG. 11 illustrates an embodiment of a battery pack 10 in which the lid 16 is removed. As illustrated, the battery pack 10 can include an upper assembly 72 positioned at an upper end of the battery pack 10. The upper assembly 72 can be positioned on a side of the main body cover 18 opposite the battery cells 36. For example, the upper assembly 72 can be positioned in a space between the main body cover 18 and the lid 16 of the enclosure 12. The upper assembly 72 can include a cooling system configured to monitor and/or control the temperature in the interior or on the exterior of the battery pack 10. For example, the upper assembly 72 can include a radiator. The radiator can include a radiator heat sink 74. The radiator heat sink 74 can comprise, for example, a metal mesh or other highly conductive structure configured to dissipate heat. The radiator heat sink 74 can be configured to collect ignited particulates. The radiator heat sink 74 can be connected to a radiator tank 75. The radiator tank 75 can form part of the radiator. The radiator tank 75 can be configured to retain coolant (e.g., air, liquid, and/or other fluid). In some embodiments, the radiator tank 75 can be configured to connect to other portions of the battery pack 10 and can be configured to hold the radiator heat sink 74 in place. In some embodiments, the upper assembly 72 can include one or more fans 77 or other air moving devices configured to move air or other fluids over, across, and/or through the radiator heat sink 74 to dissipate heat.

Figure 12:
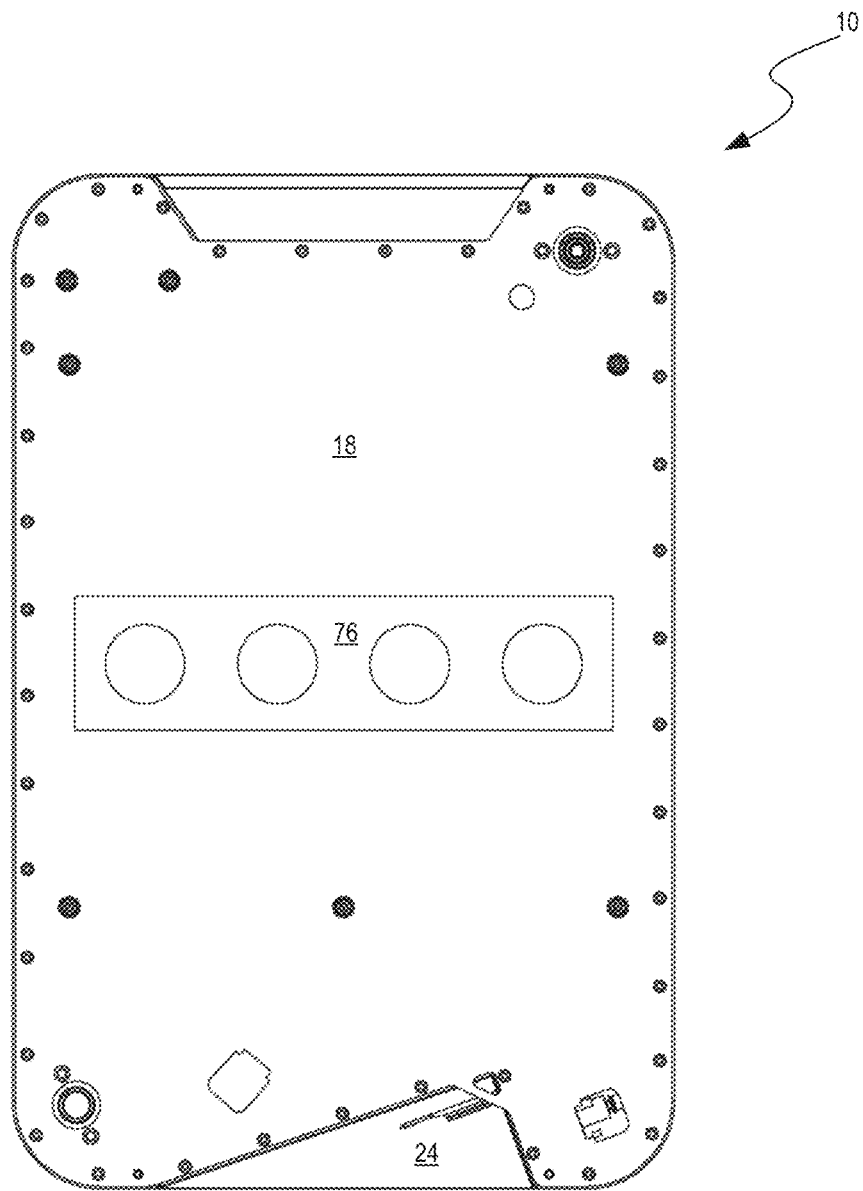
FIG. 12 illustrates a top plan view of the battery pack of FIG. 1 with the top cover and radiator assembly removed.

FIG. 12 illustrates the battery pack 10 with the top cover 16 and upper assembly 72 removed. As illustrated, the battery pack 10 can include a valve structure 76. The valve structure 76 can be positioned on or otherwise attached to the main body cover 18. In some embodiments, the valve structure 76 is connected to the top cover 16, to the main body portion 14 of the enclosure, and/or to some other portion of the enclosure 12. The valve structure 76 can be, for example, flaps, duckbill valves, tearaway material, adhesive material, or some other structure configured to normally close one or more apertures of the main body cover 18. The valve structure 76 can be configured to open in response to increased pressure beyond a cracking pressure (e.g., a minimum pressure at which the valve structure 76 is configured to open) within the main body 14 of the enclosure 12 battery pack 10.

Figure 13:
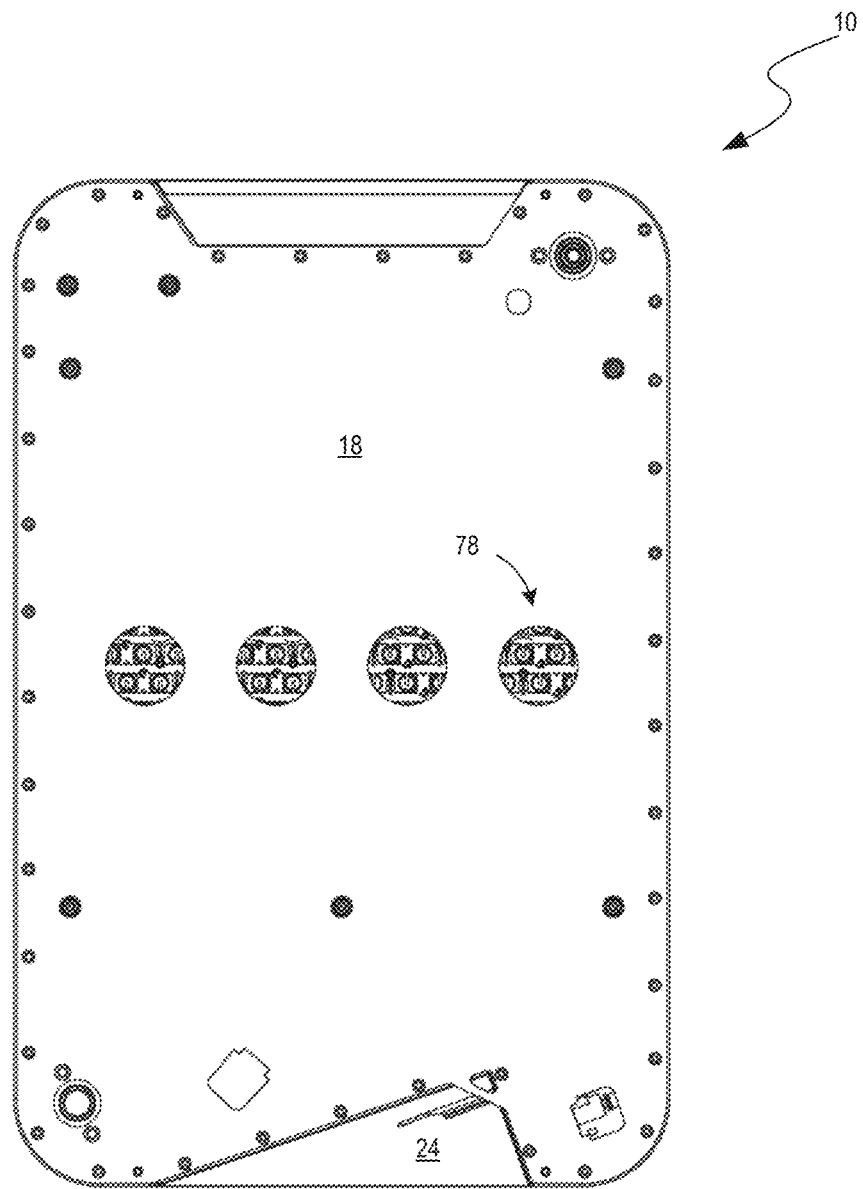
FIG. 13 illustrates a top plan view of the battery pack of FIG. 1 with the top cover, radiator assembly, and valve structure removed.

As illustrated in FIG. 13, the main body cover 18 of the enclosure 12 of the battery pack 10 can include one or more vents 78. The one or more vents 78 can be normally covered or otherwise closed by the valve 76 described above. In some embodiments, each vent 78 has a separate valve 76. When open, the vents 78 can provide fluid communication between the interior of the main body 14 enclosure 12 and an exterior of the main body 14 enclosure 12. For example, the vents 78 can provide fluid communication between the battery cells 36 and the upper assembly 72.

Figure 14:
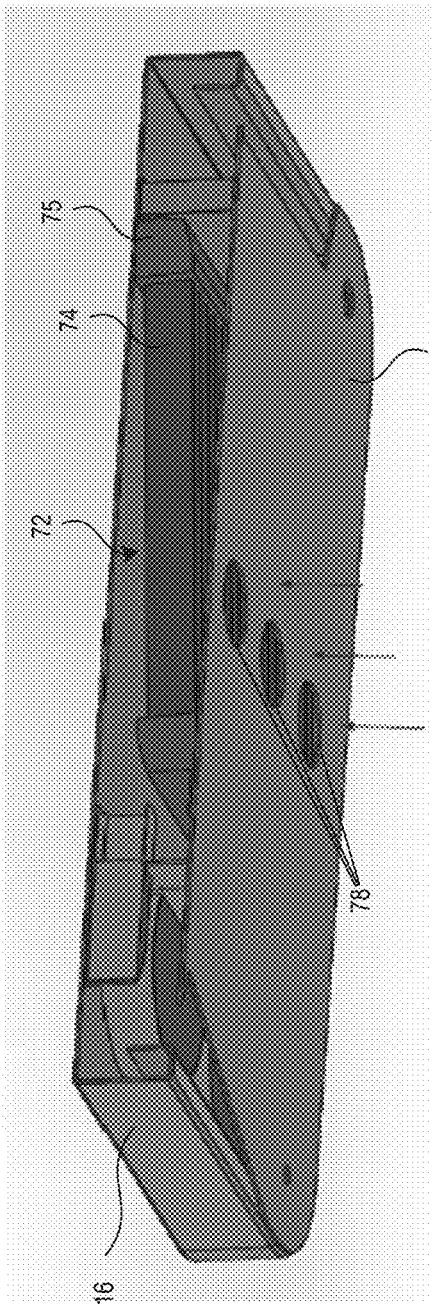
FIG. 14 illustrates a bottom perspective view of a radiator assembly.
Figure 15:
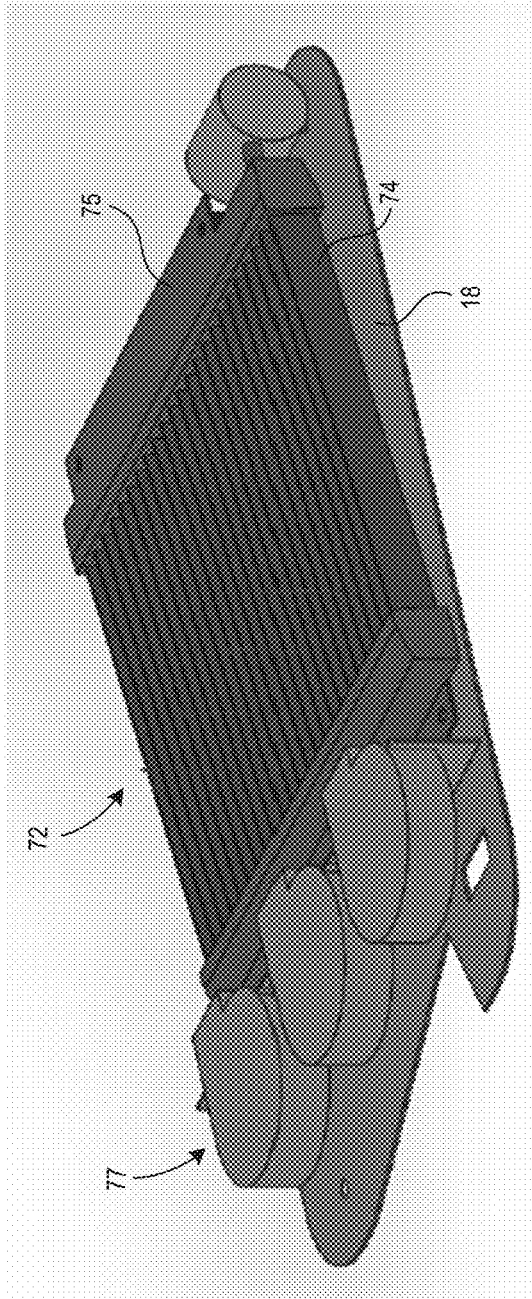
FIG. 15 illustrates a top perspective view of the radiator assembly of FIG. 14.
Figure 16:
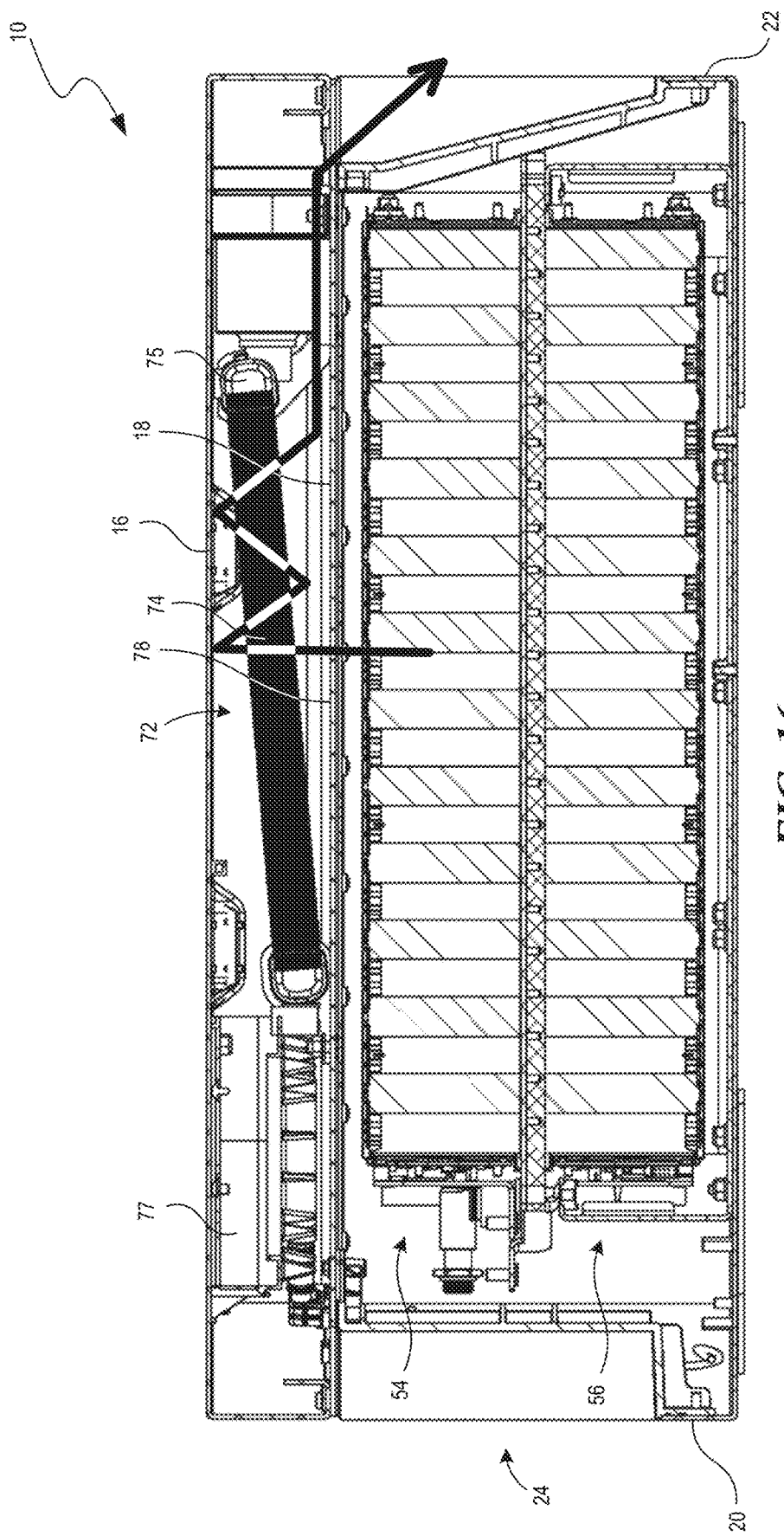
FIG. 16 illustrates a right-side cross-sectional plan view of a battery pack showing a heat transfer path in a thermal runaway event.

FIGS. 14 and 15 illustrate the main body cover 18 and radiator assembly of the battery pack 10 removed from the battery pack 10. As illustrated, hot gas and particulates (the vertical arrows) from the battery pack 10 can be directed through the runaway vents 78 toward the radiator heat sink 74 of the upper assembly 72. The radiator heat sink 74 can be configured to dissipate the heat from the battery pack 10. As illustrated in FIG. 16, hot gas and particulates (the zig-zagging arrows) exiting the battery pack 10 through the vent holes 78 can travel through the radiator heat sink 74 at least once and preferably multiple times as that hot gas and particulates are directed out of the battery pack 10 by the fans 77 or other air moving structures. By continuing to cycle the hot gas and particulates through the radiator heat sink 74 of the upper assembly 72, the system can reduce the likelihood that a thermal runaway event will spread from one battery cell 36 to other battery cells 36. In some embodiments, the radiator heat sink 74 of the upper assembly 72 collects particulates from the battery cells 36 (e.g., ignited particulates) when the vents 78 are opened. In some embodiments, the radiator heat sink 74 occupies more than 35%, more than 40%, more than 50%, more than 65%, and/or more than 75% of a footprint of the main body cover 18 when observed from above. In some embodiments, the radiator heat sink 74 occupies between 20%-90%, between 25%-80%, between 15%-60%, between 45%-85%, between 50%-75%, and/or between 35%-95% of a footprint of the main body cover 18 when observed from above. The large footprint of the heat sink 74 and/or the tortuous path provided by the vent assembly 72, lid 12, and main body cover 18 can allow the radiator heat sink 74 to collect much or all of the flaming particulates that exit the main body 14 through the vents 78. In some embodiments, the fans 77 are configured to shut down in a thermal runaway scenario. Shutting down the fans 77 can, in some embodiments, facilitate movement of hot gas/particulates toward openings in the battery pack closest to the vent from which the gas/particulates exit.

In some embodiments, the upper assembly 72 described herein is a standard upper assembly 72 used to provide cooling to the battery pack 10. Use of a standard radiator, which would be present in many battery packs, can reduce or eliminate cost and weight increases for thermal runaway functionality. Use of standard radiators can also allow for retrofitting of already-manufactured battery packs 10 with vents 78 and/or valves 76 to provide a controlled vent path in the event of thermal runaway and/or to add thermal-runaway resistance to existing battery packs 10.

Referring back to FIG. 11, the battery pack 10 can include one or more fluid ports 73a, 73b configured to facilitate transfer of coolant (e.g., water, refrigerant, and/or other coolant fluids) into and out from the main body 14 of the battery pack 10. For example, a first fluid port 73a can be positioned on the cover 18 or in another wall of the main body 14. A second fluid port 73b can also be positioned on the cover 18 or in another wall of the main body 14. In some embodiments, one of the ports 73a, 73b functions as a coolant fluid inlet and the other port 73a, 73b functions as a coolant fluid outlet.

Referring to FIG. 6, the fluid ports 73a, 73b can be in fluid communication with coolant interfaces 53a, 53b, respectively. The coolant interfaces 53a, 53b can be positioned on the cold plate 46 and can be configured to facilitate fluid ingress and egress from an interior of the cold plate 46. The cold plate 46 can include one or more interior fluid channels configured to direct coolant throughout the cold plate 46. For example, the cold plate 46 can include channels in a serpentine pattern, ladder-rung pattern, brick-mortar pattern, and/or some other pattern or combination of patterns. The battery pack 10 can include a pump configured to direct fluid through one of the fluid ports 73a, 73b, through one of the coolant interfaces 53a, 53b, through the cold plate 46, through the other coolant interface 53a, 53b, and out from the battery pack 10 through the other fluid port 73a, 73b.

In some embodiments, it is preferable to cool the battery pack 10 using the fans 77 and radiator heat sink 74. For example, in scenarios where it is desirable to move the battery pack 10 onto and off a boat with regularity, using the fans 77 and heat sink 74 eliminates the need to fluidly connect the battery pack 10 to a coolant source. On the other hand, for scenarios in which the battery pack 10 will remain in place for extended periods, it may be desirable to deactivate or remove the fans 77 and radiator heat sink 74 in favor of using coolant to cool the cold plate 46, as described above. For example, the use of coolant can, in some scenarios, require less power and can otherwise be more efficient than using the fans 77 and heat sink 74. In some embodiments, water from the surrounding environment can be used as the coolant for the battery pack 10.

Figure 19:
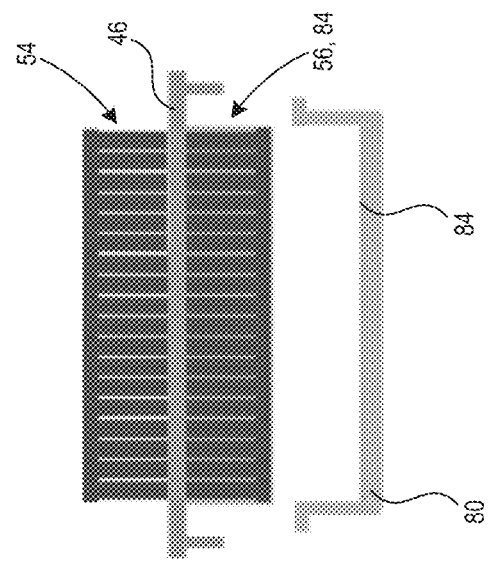
FIGS. 17-19 illustrate a dipping process for coating battery cells with coating material.
Figure 18:
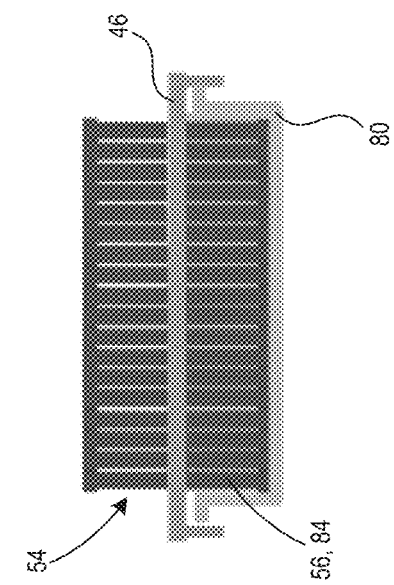
Figure 17:
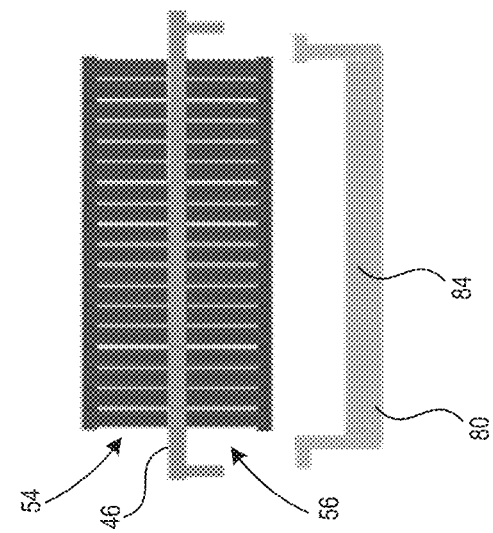

In some embodiments, one or all of the cells 36 are at least partially coated with a coating during manufacture of the battery pack 10. For example, as illustrated in FIGS. 17-19, cell arrays 54, 56 can be dipped into a dipping fixture 80. The dipping fixture 80 can contain a coating material 84. The coating material 84 can be, for example, a dielectric material, a polymer, a thermoplastic, and/or some other material having thermal, electrical, and/or mechanical insulative properties. In some embodiments, the coating material 84 can reduce the risk of damage to the battery assemblies 34 during manufacture and/or shipping. In the representative embodiment, the coating material 84 reduces the risk of thermal runaway between adjacent cells 36. In some embodiments, the coating material 84 provides corrosion resistance to the battery cells 36 (e.g., in wet, humid, and/or marine environments). The coating material 84 can reduce the risk of corrosion (e.g., galvanic corrosion) at intermetallic connections (e.g., between the collector strips 40 and cells 36). In some embodiments, the coating material 84 can reduce the risk of shorts between cells 36. For example, the coating material 84 can reduce the risk of shock to a person handling the battery pack 10 and can reduce the risk of shorts between cells 36 if an object were dropped or set upon the cells 36 after coating.

The coating material 84 can be relatively thin. For example, the material can be between about 0.07 mm-0.8 mm, between about 0.05 mm-1 mm, between about 0.1-0.6 mm, between about 0.2 mm-0.4 mm, between about 0.3 mm-0.45 mm, and/or between about 0.25 mm-0.35 mm. Using a thin coating can reduce the overall weight of the battery assembly 34.

After dipping the array 54, 56 into the dipping fixture 80, the array 54, 56 can be lifted from the dipping fixture 80, allowing the excess coating material 84 to drip from the array. In some embodiments, the depth L1 (FIG. 21) to which the cells 36 are dipped is less than an entire depth L2 (FIG. 21) of the cell 36. For example, the cells 36 can be dipped less than 98%, less than 95%, less than 90%, less than 80%, less than 65%, and/or less than 50% of their length into the dipping fixture. In some embodiments, the depth L1 of the coating of the cells 36 is between 40%-98%, between about 10%-35%, between 25%-75%, between 40%-55%, between 45%-60%, between 55%-89%, between 70%-80%, between 75%-95%, between 85-90%, and/or between 90-97% of the total length L2 of the cells 36. In some embodiments, the depth L1 of the coating of the cells 36 is approximately 10%, approximately 50%, or approximately 75% of the total length L2 of the cells 36.

Figure 21:
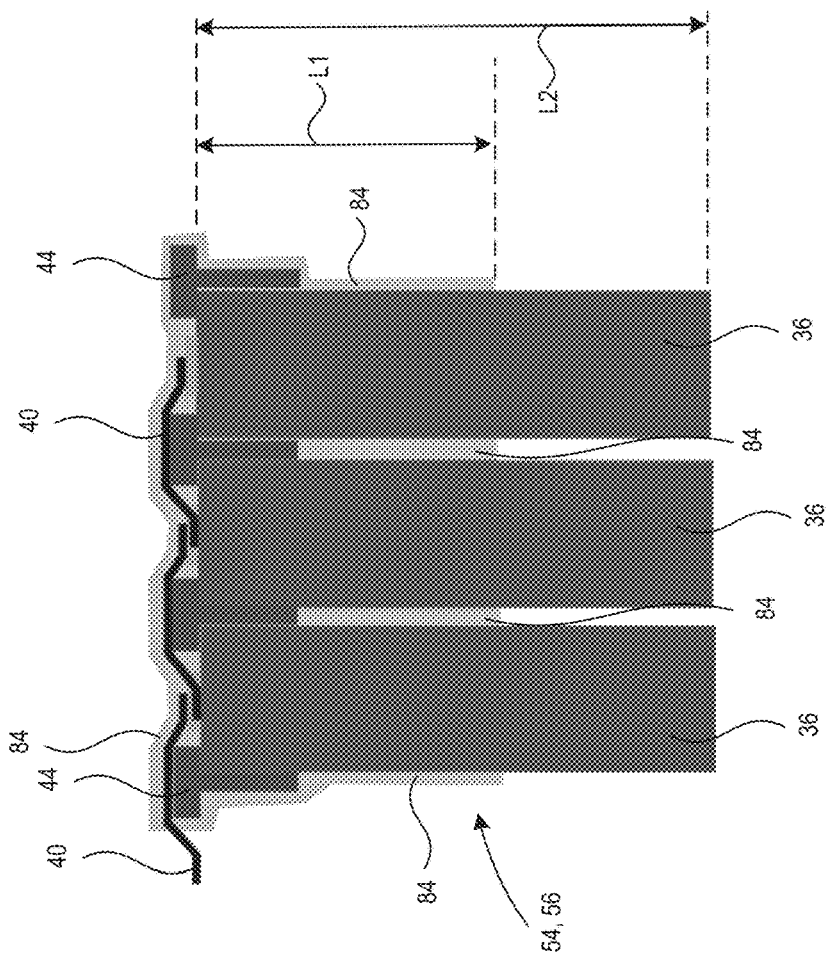
FIGS. 20 and 21 illustrate uncoated and coated battery cells arrays, respectively.
Figure 20:
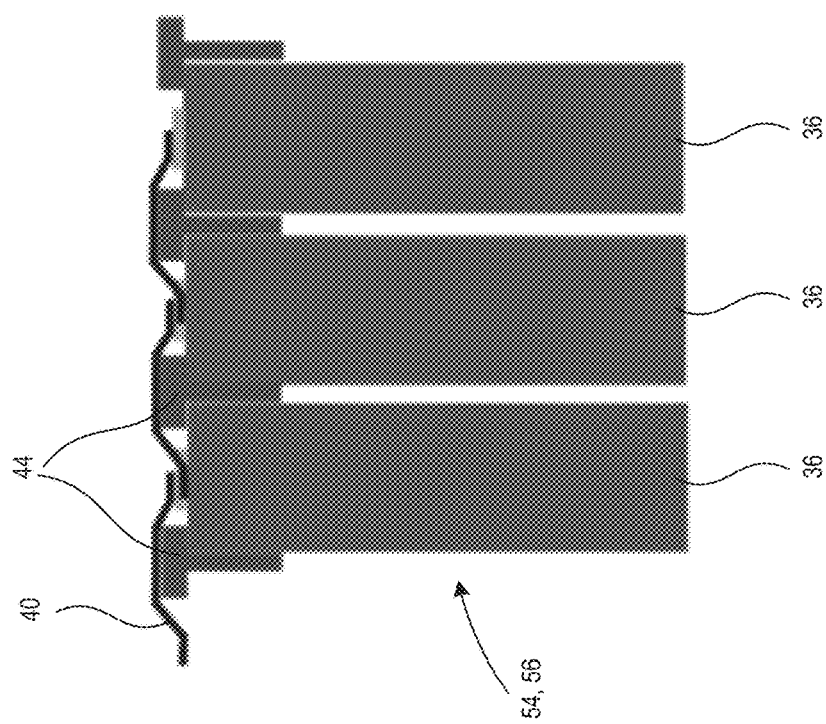

As illustrated in FIGS. 20 and 21, the coating 84 can encapsulate the collector strips 40, the insulator 44, and a majority of the length of the cells 36. In some embodiments, the coating 84 fully encapsulates all points of attachment between the collector strips 40 and the cells 36. Coating the collector strip 40 and insulator 44 can provide mechanical support to the cells 36, strips 40, and/or insulators 44 by reducing the likelihood of disconnect between the collector strip 40, insulator 44 and the cells 36 during and after manufacture of the battery pack 10 is manufactured. In some applications, use of coating material 84 on the cells 36, insulators 44, and collector strips 40 can reduce the need for additional adhesives or other connection structure between the insulators, collector strips 40 and cells 36. This can reduce the manufacturing time and cost associated with use of adhesives and other connectors.

As compared to potted battery assemblies, a dipped module according to the present disclosure can be significantly lighter. For example, weight reductions of 45%-50%, 40%-70%, and/or 55%-80% can be realized as compared to fully-encapsulated battery packs/assemblies. These weight reductions can be attributed at least in part to lack of total coating of the cells 36 and/or lack of coating material 84 in the spaces between cells 36 of adjacent rows.

From the foregoing, it will be appreciated that specific embodiments of the presently disclosed technology have been described herein for purposes of illustration, but that various modifications may be made without deviating from the technology. For example, in some illustrated embodiments, the upper and lower cell arrays are distributed in rows and columns. In other embodiments, the cell arrays may be arranged in multiple rows and a single column, multiple rows and three columns, and/or some other combination of rows and columns.

Certain aspects of the technology described in the context of particular embodiments may be combined or eliminated in other embodiments. For example, in some embodiments, a single vent hole may be utilized. The corresponding valve(s) can be adjusted accordingly. In some embodiments, a single array of battery cells may be used instead of the upper and lower array configuration of the disclosed embodiments. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the phrase "and/or," as in "A and/or B" refers to A alone, or B alone, or A and B.

As used herein, the phrase "fluid communication" refers to communication of gases, particulates, liquids, and/or other fluids between one point in space and another point in space.

To the extent any materials incorporated herein by reference conflict with the present disclosure, the present disclosure controls.

We claim:

1. A battery pack comprising:
an enclosure; and
a battery assembly positioned within the enclosure, the battery assembly comprising:
a plurality of battery cells, with individual battery cells comprising a cathode and an anode on a first end of the battery cell;
an insulator positioned at the first end of at least some of the plurality of battery cells;
a collector strip electrically connected to the anodes and cathodes of at least a plurality of the plurality of battery cells; and
an insulative and/or protective coating covering at least a portion of the insulator and the collector strip;
wherein the insulative and/or protective coating covers less than 98% of a length of each battery cell and more than 10% of the length of each battery cell.

2. The battery pack of claim 1, wherein the insulative and/or protective coating covers less than 35% of a length of each battery cell and more than 10% of the length of each battery cell.

3. The battery pack of claim 1, wherein the insulative and/or protective coating covers less than 75% of a length of each battery cell and more than 25% of the length of each battery cell.

4. The battery pack of claim 1, wherein the insulative and/or protective coating fully encapsulates all points of attachment between the collector strips and the anodes and the cathodes of the plurality of battery cells.

5. The battery pack of claim 1, wherein the insulative and/or protective coating is formed by dipping the plurality of battery cells, the insulator, and the collector strips at least partially into a dipping fixture containing a dielectric material.

6. A method of manufacturing the battery pack of claim 1, the method comprising dipping the plurality of battery cells, the insulator, and the collector strips at least partially into a dipping fixture containing the coating.

* * * * *

UNITED STATES PATENT AND TRADEMARK OFFICE
CERTIFICATE OF CORRECTION

| | |
|---|---|
| PATENT NO. | : 11,688,899 B2 |
| APPLICATION NO. | : 16/546212 |
| DATED | : June 27, 2023 |
| INVENTOR(S) | : Richard Theodore Wurden et al. |

It is certified that error appears in the above-identified patent and that said Letters Patent is hereby corrected as shown below:

On the Title Page

Page 2, item (56), in Column 2, under "Other Publications", Line 5, delete "Decemeber" and insert -- December --.

In the Specification

In Column 2, Line 55, delete "clarity" and insert -- clarity. --.

Signed and Sealed this
Tenth Day of October, 2023

Katherine Kelly Vidal
*Director of the United States Patent and Trademark Office*